(12) United States Patent
Vilim et al.

(10) Patent No.: US 10,817,472 B2
(45) Date of Patent: Oct. 27, 2020

(54) STORAGE ORGANIZATION SYSTEM WITH ASSOCIATED STORAGE UTILIZATION VALUES

(71) Applicant: Dropbox, Inc., San Francisco, CA (US)

(72) Inventors: Peter Vilim, San Francisco, CA (US); Angela Gong, San Mateo, CA (US); Lael Costa, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 300 days.

(21) Appl. No.: 15/791,168

(22) Filed: Oct. 23, 2017

(65) Prior Publication Data
US 2019/0121874 A1   Apr. 25, 2019

(51) Int. Cl.
| | |
|---|---|
| *G06F 16/16* | (2019.01) |
| *G06F 16/13* | (2019.01) |
| *G06F 16/26* | (2019.01) |
| *G06F 16/27* | (2019.01) |
| *G06F 16/178* | (2019.01) |
| *G06F 16/22* | (2019.01) |
| *G06F 3/0482* | (2013.01) |
| *G06F 3/0484* | (2013.01) |

(52) U.S. Cl.
CPC ............ *G06F 16/168* (2019.01); *G06F 16/13* (2019.01); *G06F 16/178* (2019.01); *G06F 16/2246* (2019.01); *G06F 16/26* (2019.01); *G06F 16/27* (2019.01); *G06F 3/0482* (2013.01); *G06F 3/04847* (2013.01)

(58) Field of Classification Search
CPC .... G06F 16/168; G06F 16/27; G06F 16/2246; G06F 16/26; G06F 16/178; G06F 16/13; G06F 3/0482; G06F 3/04847

USPC .......................... 707/634, 821, 822, 828, 829
See application file for complete search history.

(56) References Cited

U.S. PATENT DOCUMENTS

| | | |
|---|---|---|
| 7,917,494 B2 | 3/2011 | Muller |
| 8,312,242 B2 | 11/2012 | Casper et al. |
| 8,694,564 B2 | 4/2014 | Guarraci |

(Continued)

OTHER PUBLICATIONS

V. Swathy et al., "Providing Advanced Security Mechanism for Scalable Data Sharing in Cloud Storage," 2016 International Conference on Inventive Computation Technologies (ICICT), 2016, vol. 3, pp. 1-6.

*Primary Examiner* — Hares Jami
(74) *Attorney, Agent, or Firm* — Polsinelli PC

(57) ABSTRACT

In some embodiments, a method can involve storing a database containing information about content items associated with a user account on a content management system, the information identifying a storage organization of the content items and respective data sizes of the content items. The method can involve generating, based on the information, a tree structure including a plurality of nodes representing the content items and depicting the storage organization of the content items, the plurality of nodes identifying storage utilization values of the content items being based on their respective data sizes. The method can involve storing the tree structure on memory and, in response to an input, determining, from the tree structure, the storage organization of the content items and storage utilization values. The method can further involve displaying the content items and storage utilization values on a user interface according to the storage organization of the content items.

20 Claims, 13 Drawing Sheets

(56) References Cited

U.S. PATENT DOCUMENTS

| | | | |
|---|---|---|---|
| 8,700,670 B2 | 4/2014 | Marathe et al. | |
| 8,880,474 B2 | 11/2014 | Mason et al. | |
| 9,298,384 B2 | 3/2016 | Kang et al. | |
| 9,401,959 B1* | 7/2016 | Lai | G06F 16/2255 |
| 9,454,534 B2 | 9/2016 | Thomas et al. | |
| 9,720,926 B2 | 8/2017 | Aron et al. | |
| 9,720,947 B2 | 8/2017 | Aron et al. | |
| 10,091,290 B1* | 10/2018 | Hansen | H04L 67/06 |
| 2010/0287219 A1* | 11/2010 | Caso | G06F 16/134 707/827 |
| 2011/0137974 A1* | 6/2011 | Momchilov | H04L 67/38 709/202 |
| 2015/0288744 A1* | 10/2015 | Dwan | G06Q 10/00 709/217 |
| 2015/0310035 A1 | 10/2015 | Godman et al. | |
| 2016/0034508 A1 | 2/2016 | Aron et al. | |
| 2016/0127383 A1* | 5/2016 | Childs | G06F 3/0484 726/30 |
| 2016/0210238 A1 | 7/2016 | Frank et al. | |
| 2016/0232220 A1* | 8/2016 | Newhouse | G06F 16/162 |
| 2016/0292193 A1* | 10/2016 | Madanapalli | H04L 67/1097 |
| 2016/0371297 A1* | 12/2016 | Okun | G06F 16/185 |
| 2017/0052717 A1 | 2/2017 | Rawat et al. | |
| 2017/0109385 A1 | 4/2017 | Aronovich et al. | |
| 2017/0149885 A1* | 5/2017 | Kaplan | G06F 16/178 |
| 2017/0357388 A1* | 12/2017 | Yanagihara | G06F 3/0482 |
| 2018/0101546 A1* | 4/2018 | Krasnow | G06F 16/1734 |
| 2018/0349408 A1* | 12/2018 | Jewell | G06F 16/178 |

\* cited by examiner

300

202 — CONTENT ITEM – ACCOUNT A

▽ 📁 ROOT (HOME) — 302
  📄 foo.txt — 304
▽ 📁 Bar — 306
  📄 bar1.txt — 308
  📄 bar2.txt — 310
  📄 bar3.txt — 312

*FIG. 3A*

LOCAL DATABASE – ACCOUNT A  204

| | CONTENT ITEM | SIZE | PATH |
|---|---|---|---|
| 302 | ROOT(HOME) | 40KB | / |
| 304 | foo.txt | 10KB | /foo.txt |
| 306 | Bar | 30KB | /Bar/ |
| 308 | bar1.txt | 10KB | /Bar/bar1.txt |
| 310 | bar2.txt | 10KB | /Bar/bar2.txt |
| 312 | bar3.txt | 10KB | /Bar/bar3.txt |

*FIG. 3B*

STORAGE ORGANIZATION SYSTEM WITH ASSOCIATED STORAGE UTILIZATION VALUES

TECHNICAL FIELD

The present technology pertains to tracking content space usage in synchronized collaboration environments.

BACKGROUND

The evolution and ubiquity of software and computer devices has created a digital revolution that continues to reshape business and society. Digital technologies have transformed how users work, interact, and conduct business. For example, users increasingly own and use multiple devices, which they use to maintain constant digital connectivity and ubiquitous access to their work and private data. Users often store their data on different systems to ensure access to the data from any device. Cloud storage solutions are frequently used by users to manage their data in a centralized location accessible over the network from any device. At the same time, users may also retain a local copy of their data on their personal devices for increased portability and availability.

The combination of local and cloud storage provides many advantages for users, such as high availability and ubiquitous access. However, the combination of local and cloud storage can also create many difficulties. For example, the data can become disorganized and difficult to manage as numerous copies of data are distributed across different storage locations, which can negatively impact the utility of the data and efficiency of the user. Moreover, given the limited storage capacity of personal and mobile devices, users are increasingly at risk of running out of local storage space on their devices, particularly as the volume of their data grows. Indeed, the user's data consumption needs often outgrow their device's storage capabilities. Users may even inadvertently run out of storage space on their devices. This can create significant technical problems for the user, including device failure and loss of data.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not, therefore, to be considered to be limiting of its scope, the principles herein are described and explained with additional specificity and detail through the use of the accompanying drawings in which:

FIG. 3A illustrates an example storage organization of content items according to a directory structure;

FIG. 3B illustrates an example local database containing information about content items of a user account;

DETAILED DESCRIPTION

Figure 1:
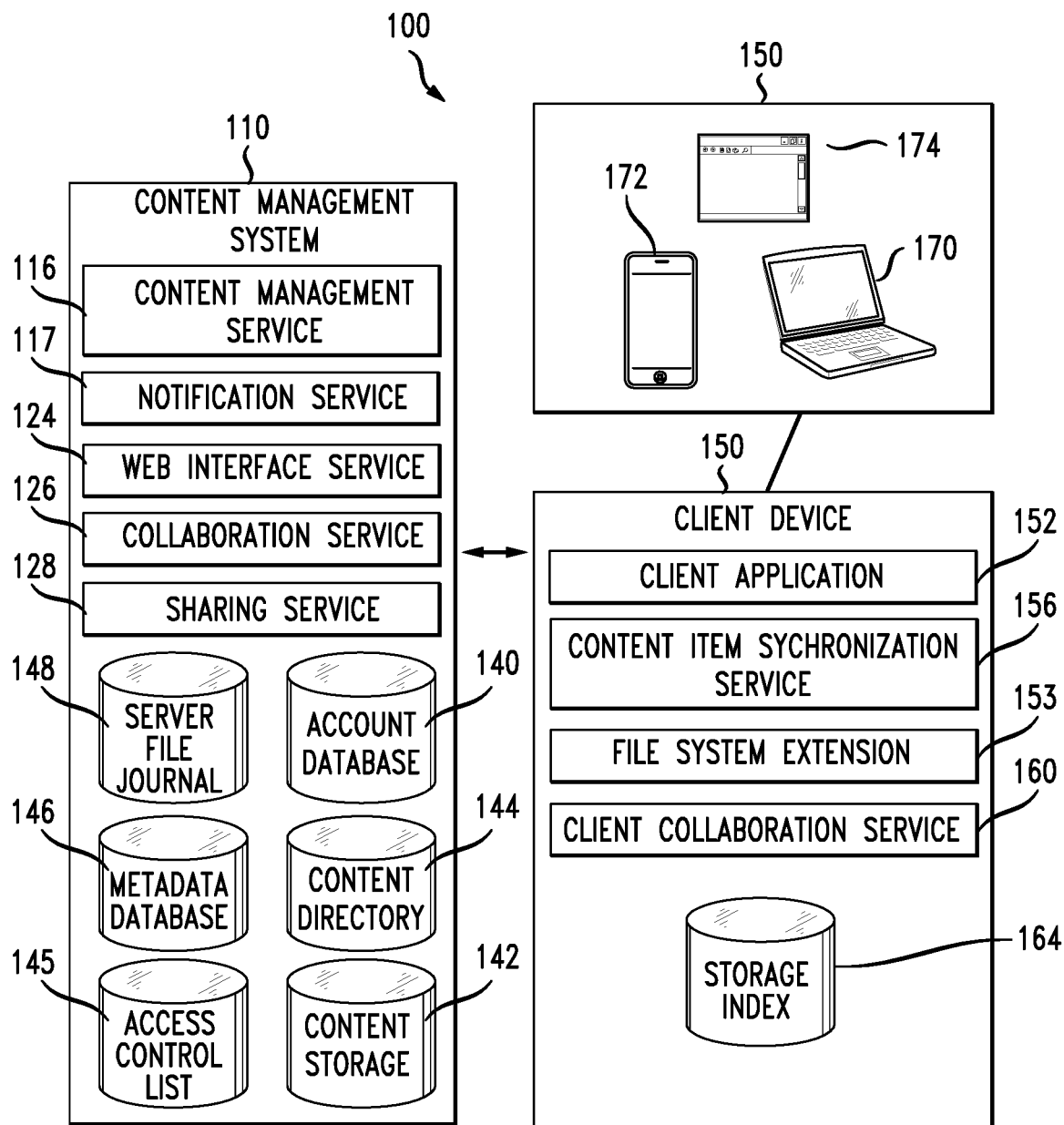
FIG. 1 illustrates an example system configuration of a content management system and client devices.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Managing and tracking data and storage space usage can be a daunting task. As previously explained, user data often becomes disorganized and difficult to manage, particularly as the volume of data grows and copies are distributed across different locations. Moreover, given the limited storage capacity of user devices, the data can quickly consume the available storage space at a user's device. Users often fail to properly plan and manage storage space usage, as space consumption calculations can be tedious and inefficient, thus increasing the user's risk of running out of storage space on a device.

The disclosed technology addresses the need in the art for accurately and efficiently tracking, managing, and planning data space consumption and availability. The approaches set forth herein can efficiently track and forecast storage space information and provide users greater visibility of storage space consumption and availability. The content and storage space management strategies described herein can significantly improve storage space tracking and management capabilities in standalone environments as well as distributed environments, such as local and cloud collaboration environments.

For example, as further described herein, a system, such as a client device, can store a database of information about content items associated with a user account on a content management system, including information identifying a storage organization of the content items and respective data sizes associated with the content items. The storage organization can indicate the storage structure (e.g., a directory structure of the content items) and relationship of the content items (e.g., hierarchical relationship), and the respective data sizes can indicate the storage space consumption of the content items. The content items can include local content items (e.g., content items stored locally on the system) and/or online content items (e.g., content items stored on one or more remote systems).

Based on the information in the database, the system can generate a tree data structure including a plurality of nodes representing the content items and depicting the storage organization of the content items. For example, the tree data structure can include a respective node for every content item, and the nodes in the tree can be interconnected to reflect the storage organization or structure of the content items, such as the directory structure of the content items. The plurality of nodes can identify storage utilization values associated with the content items, which can be based on the respective data sizes of the content items. For example, each node can include information about a respective content item represented by that node, such as the content item's size, name, directory, storage location, path, etc.

The system can store the tree data structure in memory for quick access and increased performance. In response to a user input, such as a user request to view space information for the content items, the system can determine, from the tree data structure in memory, the storage organization of the content items and the storage utilization values, and display the content items and storage utilization values on a graphical user interface. The system can display the content items according to the storage organization of the content items in order to depict how the content items are stored and/or related. Moreover, the storage utilization values can indicate the storage space used or required by each content item. The system can also display the total space consumption of the content items, which it can efficiently obtain from the tree data structure in memory.

The system can also synchronize some or all of the content items with a remote system, such as an online content management system, and display the location and space consumption of each content item, based on the tree data structure in memory. The system can also display the total storage space used on the system by the content items stored locally as well as the total storage space used by all content items stored remotely. The system can quickly and dynamically adjust the total storage space use calculations for the local content items and the remote content items as the user modifies which content items are stored or synchronized locally on the system and which are maintained remotely.

Figure 2:
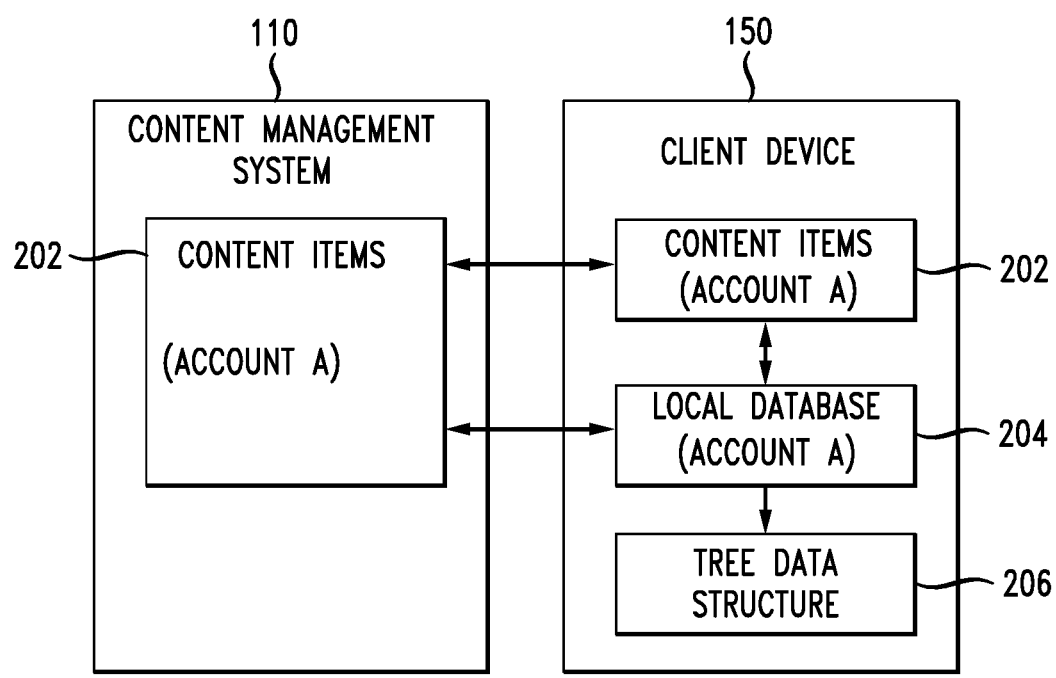
FIG. 2 illustrates an example configuration for tracking storage space information for content items and managing storage space consumption on a client device.

Further description, examples, and variations are provided below in the disclosure as follows. The disclosure begins with a discussion of example architectures and environments for managing content items and tracking storage space information, as shown in FIGS. 1 and 2. A more detailed description of technologies for managing content items and tracking storage space information, as shown in FIGS. 3 through 9, including various examples and configurations, will then follow. The disclosure concludes with a description of an example computing device for managing content items and tracking storage space information, as shown in FIG. 10. The disclosure now turns to FIG. 1.

In some embodiments the disclosed technology is deployed in the context of a content management system having content item synchronization capabilities and collaboration features, among others. An example system configuration 100 is shown in FIG. 1, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, company, etc.) can create an account with content management system, and account details can be stored in account database 145. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. As used herein, content items can be any digital data such as documents, collaborative content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content management service 116, which includes software or other processor executable instructions for managing the storage of content items including, but not limited to, receiving content items for storage, preparing content items for storage, selecting a storage location for the content item, retrieving content items from storage, etc. In some embodiments, content management service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content management service 116 can output a unique ID for each content item.

Content management service 116 can also designate or record a content path for a content item. The content path can include the name of the content item and/or folder hierarchy associated with the content item. For example, the content path can include a folder or path of folders in which the content item is stored in a local file system on a client device. Content management service 116 can use the content path to present the content items in the appropriate folder hierarchy, such as a tree-like directory structure. While content items are stored in content storage 142 in blocks and may not be stored under a tree like directory structure, such directory structure is a comfortable navigation structure for users Content management service 116 can define or record a content path for a content item wherein the "root" node of a directory structure can be a namespace for each account. Within the namespace can be a directory structure defined by a user of an account and/or content management service 116. Content directory 144 can store the content path for each content item as part of a content entry.

In some embodiments the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 116 can also store metadata describing content items, content item types, folders, file path, and/or the relationship of content items to various accounts, collections, or groups in metadata database 146, in association with the unique ID of the content item.

Content management service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control that tracks changes to content items, different versions of content items (including diverging version trees), and a change history that can be acquired from the server file journal 148. The change history can include a set of changes that, when applied to the original content item version, produce the changed content item version.

Content Item Synchronization

Another feature of content management system 110 is synchronization of content items with at least one client device 150. Client device(s) can take different forms and have different capabilities. For example, client device 170 is a computing device having a local file system accessible by multiple applications resident thereon. Client device 172 is a computing device wherein content items are only accessible to a specific application or by permission given by the specific application, and the content items are stored either in an application specific space or in the cloud. Client device 174 is any client device accessing content management system 110 via a web browser and accessing content items via a web interface. While example client devices 170, 172, and 174 are depicted in form factors such as a laptop, mobile device, or web browser, it should be understood that the descriptions thereof are not limited to devices of these example form factors. For example a mobile device such as client 172 might have a local file system accessible by multiple applications resident thereon, or client 172 might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a content item synchronization service 156.

Content item synchronization service 156 can be in communication with content management service 116 to synchronize changes to content items between client device 150 and content management system 110.

Client device 150 can synchronize content with content management system 110 via content synchronization service 156. The synchronization can be platform agnostic. That is, content can be synchronized across multiple client devices of varying type, capabilities, operating systems, etc. Content synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while file system extension 156 (which can be integrated with the local file system, or even the operating system kernel) can intercept read, write, copy, move, delete commands relative to content items in the designated location of the file system of client device 150.

When file system extension 153 notices a write, move, copy, or delete command, it can notify content item synchronization service 156, which can synchronize the changes to content management system service 116. In some embodiments, content item synchronization service 156 can perform some functions of content management system service 116 including functions addressed above such as dividing the content item into blocks, hashing the content item to generate a unique identifier, etc. Content synchronization service 156 can index content within client storage index 164 and save the result in storage index 164. Indexing can include creating a unique identifier for each content item. In some embodiments, content synchronization service 156 creates this unique identifier by putting the data of the content item (e.g., excluding the filename and/or other metadata) through a hash function; as addressed above, content management system can use a similar process to provide identifiers to content on content management system 110.

Content synchronization service 156 can use storage index 164 to facilitate the synchronization of at least a portion of the content within client storage with content associated with a user account on content management system 110. For example, content synchronization service 156 can compare storage index 164 with content management system 110 and detect differences between content on client storage and content associated with a user account on content management system 110. Content synchronization service 156 can then attempt to reconcile differences by uploading, downloading, modifying, and deleting content on client storage as appropriate. Content management service 116 can store the changed or new block for the content item and update server file journal 148, metadata database 146, content directory 144, content storage 142, account database 140, etc. as appropriate.

When synchronizing from content management system 110 to client device 150, a modification, addition, deletion, move of a content item recorded in server file journal 148 can trigger a notification to be sent to client device 150 using notification service 117. When client device 150 is informed of the change to server file journal 148, client device can check storage index 164 to determine if the time stamp of the change occurred since the last synchronization, or determine if the specific change has been synchronized. When client device 150 determines that it is out of synchronization with content management system 110, content item synchronization service 156 requests content item blocks including the changes, and updates its local copy of the changed content items. In some embodiments, notification service can query other services or databases of content management system 110 such as server file journal 148 to gain more context for the notification, to determine if a notification can be batched with another notification or to supplement a notification Sometimes client device 150 might not have a network connection available. In this scenario, content item synchronization service 156 can monitor the linked collection for content item changes and queue those changes for later synchronization to content management system 110 when a network connection is available. Similarly, a user can manually start, stop, pause, or resume synchronization with content management system 110.

Content item synchronization service 156 can synchronize all content associated with a particular user account on content management system 110. Alternatively, content item synchronization service 156 can selectively synchronize a portion of the content of the total content associated with the particular user account on content management system 110. Selectively synchronizing only a portion of the content can preserve space on client device 150 and save bandwidth.

In some embodiments, content item synchronization service 156 selectively stores a portion of the content associated with the particular user account and stores placeholder content items in client storage for the remainder portion of the content. For example, content item synchronization service 156 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain.

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Presence and Seen State

Content management system 110 can provide information about how users are interacting or have interacted with a content item, such as a shared content item. Content management system 110 can report that a user whom which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item. Content management system 110 and/or client device 150 can track user interactions with content, such as read or write events, and maintain a history of such events and interactions for a user.

Content management system 110 can report a history of user interactions with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

Collaboration service 126 can also provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface.

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 160 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via file system extension 153 integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

FIG. 2 illustrates an example configuration for tracking storage space information for content items 202 and managing storage space consumption on client device 150. In this example, content management system 110 stores content items 202 associated with a user account registered at content management system 110, such as user account A. Client device 150 also stores content items 202 locally at client device 150. Content management system 110 and client device 150 can synchronize content items 202 as previously explained.

For each content item in content items 202, client device 150 can locally store the actual data content of the content item or a logical representation of the content item. For example, client device 150 can store a copy of content item A in content items 202, including the data content of content item A, and a logical representation of content item B in content items 202, which can include information about content item B without the actual data content of content item B. The actual data content of content item B can be stored at content management system 110. If a user attempts to access content item B through the logical representation of content item B at client device 150, client device 150 can access the actual content of content item B through content management system 110 or download the actual content of content item B from content management system 110 for presentation at client device 150.

In some cases, a user can configure synchronization settings for user account A, which can define the synchronization of content items 202 between content management system 110 and client device 150. Through the synchronization settings, a user can specify whether a content item should be stored locally at client device 150 or remotely at content management system 110. For example, the user can configure synchronization settings specifying, for each content item in content items 202, whether client device 150 should store the content item as a local content item or an online content item. A local content item can refer to a copy of a content item in content items 202 that is stored locally at client device 150, including the actual data or content of the content item. An online content item (also referred to as a logical or virtual content item) can refer to a content item in content items 202 that is not locally stored at client device 150, but instead stored remotely (e.g., at content management system 110). However, client device 150 can store a logical representation of a logical content item, without the actual data or content of the logical content item.

The logical representation can be displayed at client device 150 to provide a visual indication or depiction of the logical content item. The logical representation of the online content item can thus depict the online content item as a virtual or logical content item within content items 202 on client device 150. In some cases, the logical representation can depict the online content item as though the online content item is stored locally at client device 150, even though the actual data or content is stored remotely at content management system 110.

Despite the actual data or content of the online content item not being locally stored at client device 150, the logical representation of the online content item can allow a user to access the online content item from client device 150. For example, the user can access the actual data or content of the online content item by selecting its logical representation on client device 150, which can trigger client device 150 to present the actual data or content from content management system 110, or download the actual data or content to client device 150, for access from client device 150. The actual data or content can be downloaded to client device 150 for persistent storage at client device 150, or temporary storage while the user interacts with the online content item, for example.

Client device 150 can store local database 204 for user account A. Local database 204 can include information about content items 202, such as a content item name, path, directory, size, type, location, synchronization setting, etc. For example, local database 204 can include the name, directory, path, and size of each content item in content items 202. The size information in local database 204 can include local and/or online storage usage of content items 202. The local storage usage of a content item can refer to an amount of local storage space used by the content item on client device 150, and the online storage usage of the content item can refer to the amount of storage space used by the content item on content management system 110. For example, for a 2 KB file stored on both client device 150 and content management system 110, the local storage usage and online storage usage of the file can each be 2 KB. For a 2 KB file that is only stored at content management system 110, the local storage usage can be 0 KB and the online storage usage can be 2 KB.

Local database 204 can be updated to reflected any changes to content items 202 on content management system 110 or client device 150. Thus, local database can be updated to reflect the current state of content items 202. For example, if a content item is added, removed, modified, moved, etc., local database 204 can be updated to reflect that the content item was added, removed, modified, moved, etc. Local database 204 can be synchronized with content items 202 by client device 150 and/or content management system 110.

Client device 150 can also store tree data structure 206 for content items 202. Tree data structure 206 can include a plurality of nodes representing content items 202. For example, tree data structure 206 can include a node for each content item in content items 202, and each node can store or indicate information about its associated content item, such as a size, name, directory, path, location, etc. Nodes in tree data structure 206 can be interconnected based on the storage organization of content items 202. For example, nodes in tree data structure 206 can be interconnected according to a hierarchical storage structure of content items 202, such as the directory structure of content items 202. Thus, the nodes in tree data structure 206 can reflect or depict how content items 202 are stored and/or related.

Tree data structure 206 can be generated based on local database 204. For example, to generate tree data structure 206, client device 150 can retrieve information from local database 204 about content items 202 (e.g., respective content item name, size, path, directory, location, etc.), and use the information to generate tree data structure 206 representing content items 202 according to the information in local database 204.

In some cases, client device 150 can store tree data structure 206 in memory for fast access when needed. For example, client device 150 can generate tree data structure 206 when client application 152 is launched at client device 150, and store tree data structure 206 in memory while client application 152 is running at client device 150. Client device 150 or client application 152 can then access tree data structure 206 from memory as needed to retrieve information, such as content item names and sizes as further described below.

Tree data structure 206 can be updated to include any changes to local database 204. For example, a modification to content items 202 can trigger an update to local database 204. When client device 150 detects the update to local database 204, it can update tree data structure 206 accordingly to reflect the update to local database 204. For example, when a 2 KB file, File A in Folder B, is deleted from content items 202, local database 204 is updated to indicate that the 2 KB file has been deleted from content items 202. The update to local database 204 can identify the name of the deleted file (e.g., File A), the size of the deleted file (e.g., 2 KB), the directory of the deleted file (e.g., /root/Folder B/), etc. Tree data structure 206 is then updated to reflect that the 2 KB file has been deleted from content items 202, based on the update to local database 204. The update to tree data structure 206 can include an update to every node in tree data structure 206 affected by the 2 KB file being deleted.

For example, a node representing File A in tree data structure 206 can be updated to indicate that File A has been deleted and the 2 KB of storage used by File A have been released. Since File A was stored in Folder B, a node representing Folder B can also be updated to reflect the deletion of File A in Folder B. For example, the node representing Folder B can be updated to reduce an indication of the size of Folder B (e.g., storage space usage) by 2 KB to reflect the deletion of File A from Folder B. Other details identified by the node representing Folder B can also be updated, such as a count of files in Folder B. Such updates can be propagated as necessary in tree data structure 206, up to the root node in tree data structure 206. For example, if Folder B is a subfolder of the root directory, the updates to File A and Folder B can be propagated to the root directory. Thus, the size information, file count, etc., of the root directory can be modified to reflect that the 2 KB file, File A, has been deleted.

Additional details and examples of tree data structure 206, content items 202, and local database 204 are provided below with reference to FIGS. 3 through 9.

FIG. 3A illustrates directory structure 300 depicting an example storage organization of content items 202. The storage organization can reflect how content items 202 are stored at client device 150 and/or content management system 110. In this example, directory structure 300 includes root folder 302. Root folder 302 can be, for example, a home folder in content items 202 for user account A.

Root folder 302 can include file 304, named foo.txt, and folder 306, named Bar, which can represent a first sub-level of directory structure 300. Root folder 302 can also include files 308, 310, 312, named bar1.txt, bar2.txt, and bar3.txt, respectively. In this example, files 308, 310, 312 are stored within folder 306. Thus, files 308, 310, 312 can represent a second sub-level of directory structure 300.

FIG. 3B illustrates an example table of local database 204 containing information about directory structure 300. In this example, the table includes name column 314, size column 316, and pathname column 318. The table also includes a row for each content item in directory structure 300, including root folder 302, file 304, folder 306, and files 308, 310, 312.

Name column 314 can include a name of each content item. For example, name column 314 can include root for root folder 302, foo.txt for file 304, Bar for folder 306, and bar1.txt, bar2.txt, and bar3.txt, for files 308, 310, 312 respectively. Size column 316 includes size information (e.g., data size or storage space use) of each item in the table. For example, size column 316 includes 40 KB, 10 KB, 30 KB, 10 KB, 10 KB, and 10 KB corresponding to content items 302, 304, 306, 308, 310, and 312, respectively.

Pathname column 318 can include a relative pathname of each content item within directory structure 300. For example, pathname column 318 can identify "/" as a pathname of root folder 302, "/foo.txt" as a pathname of file 304, "/Bar/" as a pathname of folder 306, and "/Bar/bar1.txt", "/Bar/bar2.txt", and "/Bar/bar3.txt", as a pathname of files 308, 310, 312 respectively. The relative pathname can organization of content items in directory structure 300 (e.g., the structure of directory structure 300), and can be used to identify a structure of nodes in a tree data structure (e.g., tree data structure 206) generated for content items 302, 304, 306, 308, 310, 312 in directory structure 300, as further described below.

Figure 3C:
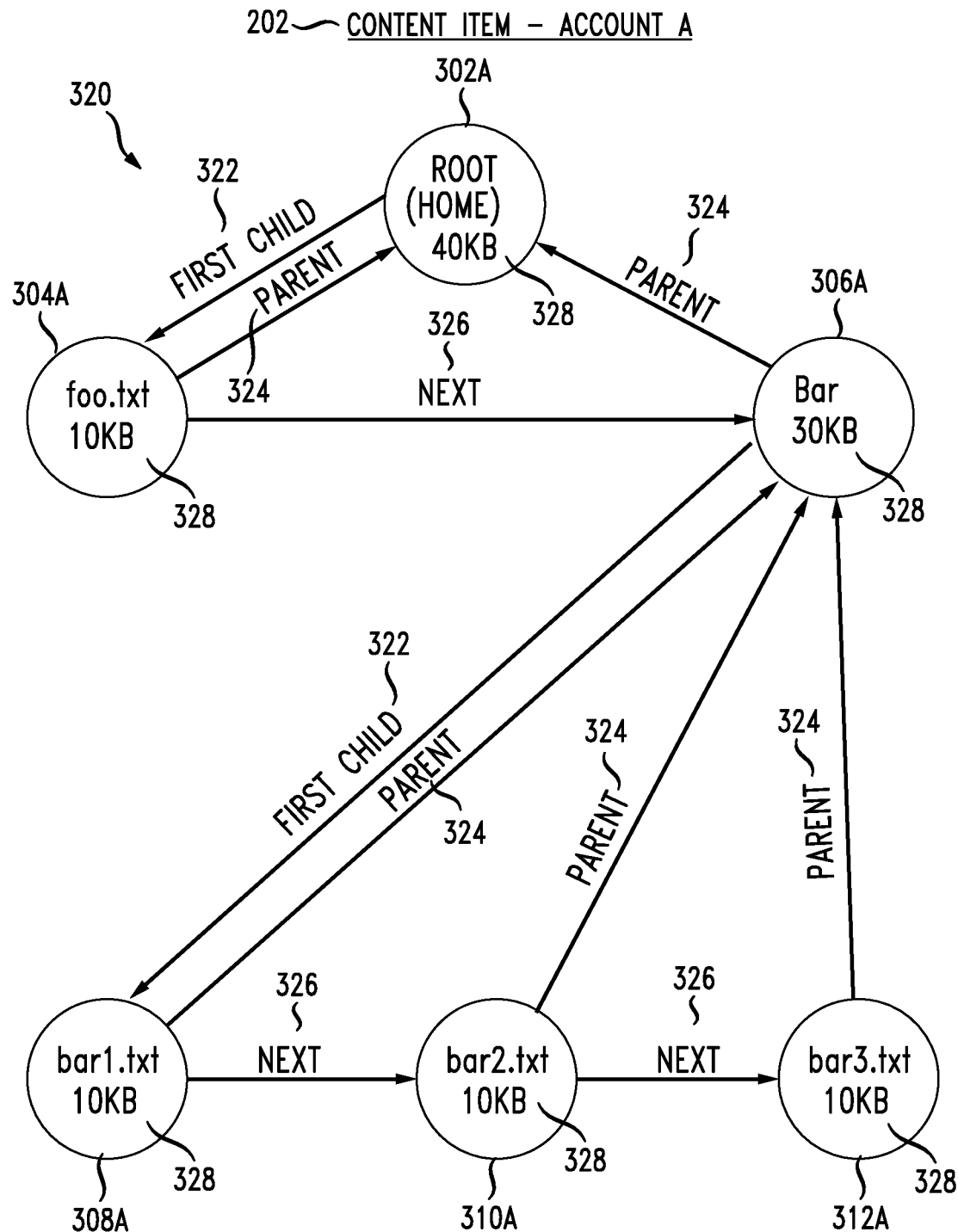
FIG. 3C illustrates an example tree data structure representing respective content items from the local database in FIG. 3B.

FIG. 3C illustrates tree data structure 320 generated for content items 302, 304, 306, 308, 310, 312 based on directory structure 300. In this example, root folder 302 is represented by root node 302A, file 304 is represented by node 304A, folder 306 is represented by node 306A, and files 308, 310, 312 are represented by nodes 308A, 310A, 312A, respectively.

Root node 302A and node 304A are interconnected according to relationships 322, 324. Relationship 322 indicates that node 304A is a first child of root node 302A and root node 302A is a parent of node 304A.

Root node 302A and node 306A are interconnected according to relationship 324, which indicates that root node 302A is a parent of node 306A. Nodes 304A and 306A are interconnected according to relationship 326, indicating that node 306A is a next child node of root node 302A.

Node 306A is interconnected with node 308A according to relationships 322, 324. Relationship 322 indicates that node 308A is a first child of node 306A and relationship 324 indicates that node 306A is a parent of node 308A. Node 306A is also interconnected with nodes 310A and 312A according to relationship 324, indicating that node 306A is a parent of nodes 310A and 312A.

Nodes 308A, 310A, 312A are also interconnected by relationship 326, indicating that node 310A is a next child node of node 306A and node 312A is a next child node of node 306A.

Nodes 302A, 304A, 306A, 308A, 310A, 312A can include size information 328, which can indicate the data size of the corresponding content item of each of nodes 302A, 304A, 306A, 308A, 310A, 312A. Size information 328 can depend on relationships 322, 324, 326, as each node's size is propagated up from that node to root node 302A through each node having parent relationship 324.

For example, size information 328 indicates a respective size of 10 KB for each of nodes 308A, 310A, and 312A, which corresponds to the size of files 308, 310, and 312 respectively represented by nodes 308A, 310A, and 312A. Size information 328 also indicates a size of 30 KB for node 306A, which corresponds to the size of folder 306 represented by node 306A and includes 10 KB for each of nodes 308A, 310A, and 312A, as node 306A has parent relationship 324 with nodes 308A, 310A, and 312A.

Size information 328 indicates a respective size of 10 KB for node 304A, which corresponds to the size of file 304 represented by node 304A. Node 304A does not have parent relationship 324 with any nodes and thus does not inherit size data from other nodes.

Size information 328 indicates a total size of 40 KB for root node 302A, which corresponds to the size of root folder 302 and includes 10 KB for node 304A, and 30 KB for node 306A, as root node 302A has parent relationship 324 with nodes 304A and 306A.

Size information 328 on a particular node can thus indicate the size of the content item corresponding to that particular node, including any content items within the content item corresponding to that particular node (e.g., any child nodes of that particular node). Accordingly, the size of the content item corresponding to that particular node can be obtained from size information 328 without having to query the size of each content item within that content item (e.g., each child node) or calculate the total size of the content item based on the size of each content item within that content item (e.g., the size of each child node). To illustrate, the total size of directory structure 300 can be retrieved from size information 328 on root node 302A, without having to query the size of each content items 304, 306, 308, 310, 312, corresponding to nodes 304A, 306A, 308A, 310A, 312A under root node 302A. In this example, the total size of directory structure 300 is 40 KB as identified by size information 328 on root node 302A. The 40 KB in this example includes 10 KB for node 304A and 30 KB for node 306A based on 10 KB from each node 308A, 310A, and 312A.

Figure 3D:
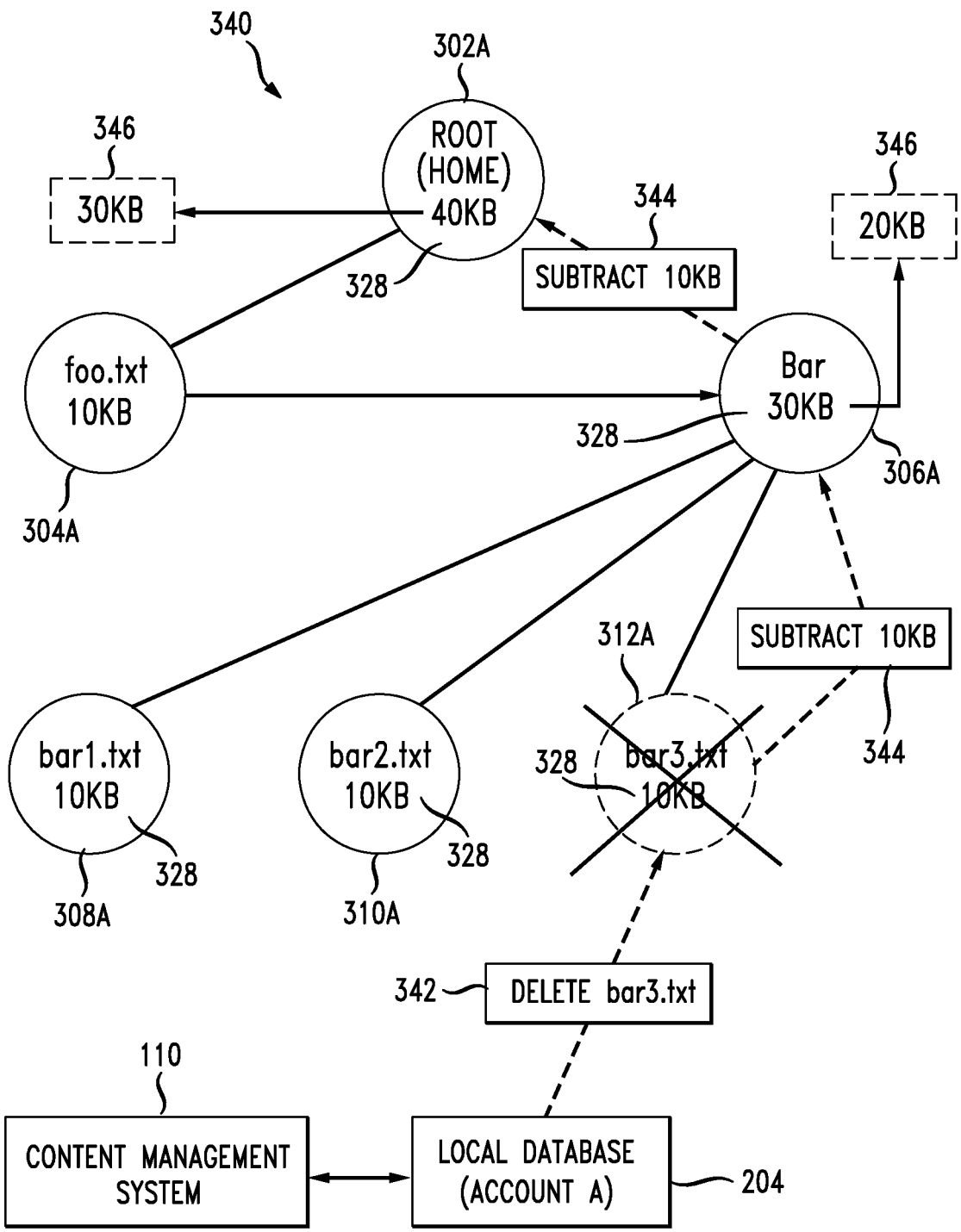
FIG. 3D illustrates an example process for updating the example tree data structure in FIG. 3C based on detected content updates.

FIG. 3D illustrates a diagram of process 340 for updating a tree data structure 320 based on a content item event. In this example, the content item event is delete event generated when file 312 (i.e., bar3.txt) is deleted from content items 202. When file 312 is deleted from content items 202, content management system 110 and client device 150 can synchronize content items 202 to ensure that file 312 is removed from content items 202 on both content management system 110 and client device 150. The delete event and/or the synchronization between content management system 110 and client device 150 can trigger an update to local database 204 on client device 150 to include delete event information 342, indicating that file 312 has been deleted from content items 202. The update to local database 204 can modify the information in local database 204 based on delete event information 342. For example, the update to local database 204 can include deleting a record of file 312 in local database 204, updating one or more records in local database 204 associated with file 312, updating one or more records in local database 204 associated with folder 306 and/or root folder 302, etc., to indicate in local database 204 that file 312 has been deleted from content items 202 and is no longer stored within folder 312 in directory structure 300.

Tree data structure 320 can then be updated based on delete event information 342 to reflect that file 312 has been deleted from content items 202 and is no longer stored within folder 312 in directory structure 300. Updates to tree data structure 320 can be triggered by, for example, one or more events, such as the deletion of file 312, the update to local database 204 based on delete event information 342, a request from client application 152, a user request, etc. Updates to tree data structure 320 can also, or otherwise, be pushed to tree data structure 320 based on, for example, a schedule (e.g., specific hours of the day, specific days of the week, etc.), a predetermined interval (e.g., x minutes, hours, etc.), a user preference, etc. For example, client device 150 can detect that local database 204 has been updated based on delete event information 342 and trigger a corresponding update to tree data structure 320 based on delete event information 342.

In this example, delete event information 342 can be retrieved from local database 104 and used to update tree data structure 320. For example, client device 150 can retrieve delete event information 342 from local database 104 and propagate updates to tree data structure 320 based on delete event information 342. As previously mentioned, delete event information 342 indicates that file 312, named bar3.txt, has been deleted from content items 202. Thus, based on delete event information 342, node 312A can be removed from tree data structure 320 to reflect that file 312 corresponding to node 312A has been deleted. In some cases, node 312A may not be deleted but rather updated to include an indication that file 312 has been deleted from content items 202. If file 312 is deleted from local storage on client device 150 but maintained stored on content management system 110, node 312A can be deleted from tree data structure 320 or updated to reflect that file 312 is stored in content management system 110 but is not stored locally on client device 150. For example, when file 312 is deleted, node 312A can be updated to indicate file 312 is not stored locally at client device 150 but is stored at content management system 110. Node 312A can also be updated to indicate a size at content management system 110 and/or client device 150. For example, as previously explained, size information 328 on node 312A indicates that file 312 has a size of 10 KB. If file 312 is deleted from client device 150, size information 328 on node 312A can be updated to identify a size of 0 KB for client device 150, which indicates that file 312 is not stored at client device 150. Size information 328 on node 312A can also be updated to identify the size of file 312 at content management system 110 (e.g., 10 KB).

File 312 can be deleted from client device 150 manually by a user, or based on a synchronization preference defined for file 312. For example, as previously explained, a user can provide a synchronization preference configuring a content item in content items 202 as a local content item or an online content item. A synchronization setting defining a content item as an online content item prevents the actual data or content of the online content item from being synchronized to, and/or stored at, client device 150. Each node in tree data structure 320 can indicate whether the node's corresponding content item is a local content item or an online content item.

If a node's corresponding content item is converted from a local content item to an online content item (e.g., via a synchronization preference), client device 150 will delete the data or content of the local content item from client device 150 as part of converting the local content item to an online content item. This convertion can trigger an update to tree data structure 320. For example, if delete event information 342 indicates that file 312 was converted from a local content item to an online content item, client device 150 can update node 312A to indicate that file 312 corresponding to node 312A is an online content item and its actual data or content is not stored at client device 150.

Delete event information 342 can also be used to update other nodes affected by the deletion of file 312. For example, the update to node 312A based on delete event information 342 can be propagated up tree data structure 320, to every parent node from node 312A to root node 302A. To illustrate, node 306A and root node 302A can be updated based on delete event information 342, as node 306A is interconnected with node 312A via parent relationship 324, indicating that node 306A is a parent of node 312A, and root node 302A is interconnected with node 306A via parent relationship 324, indicating that root node 302A is a parent of node 306A. The update to node 306A and root node 302A can modify the respective information represented by node 306A and root node 302, such as a size, a file count, etc.

For example, size information 328 of node 312A, node 306A, and root node 302A indicates a respective size of 10 KB, 30 KB, and 40 KB. Since node 312A is a child of node 306A, and node 306A is a child of root node 302A, the removal of the 10 KB associated with node 312A can trigger a 10 KB subtraction 344 from size information 328 of node 306A and node 302A, to reflect that the size of nodes 306A and 302A has been respectively reduced by 10 KB. After subtraction 344, node 306A can include updated size information 346 indicating a size of 20 KB (30 KB-10 KB) for node 306A, and root node 302A can include updated size information 340 indicating a total size of 30 KB (40 KB-10 KB) for root node 302A.

Figure 4:
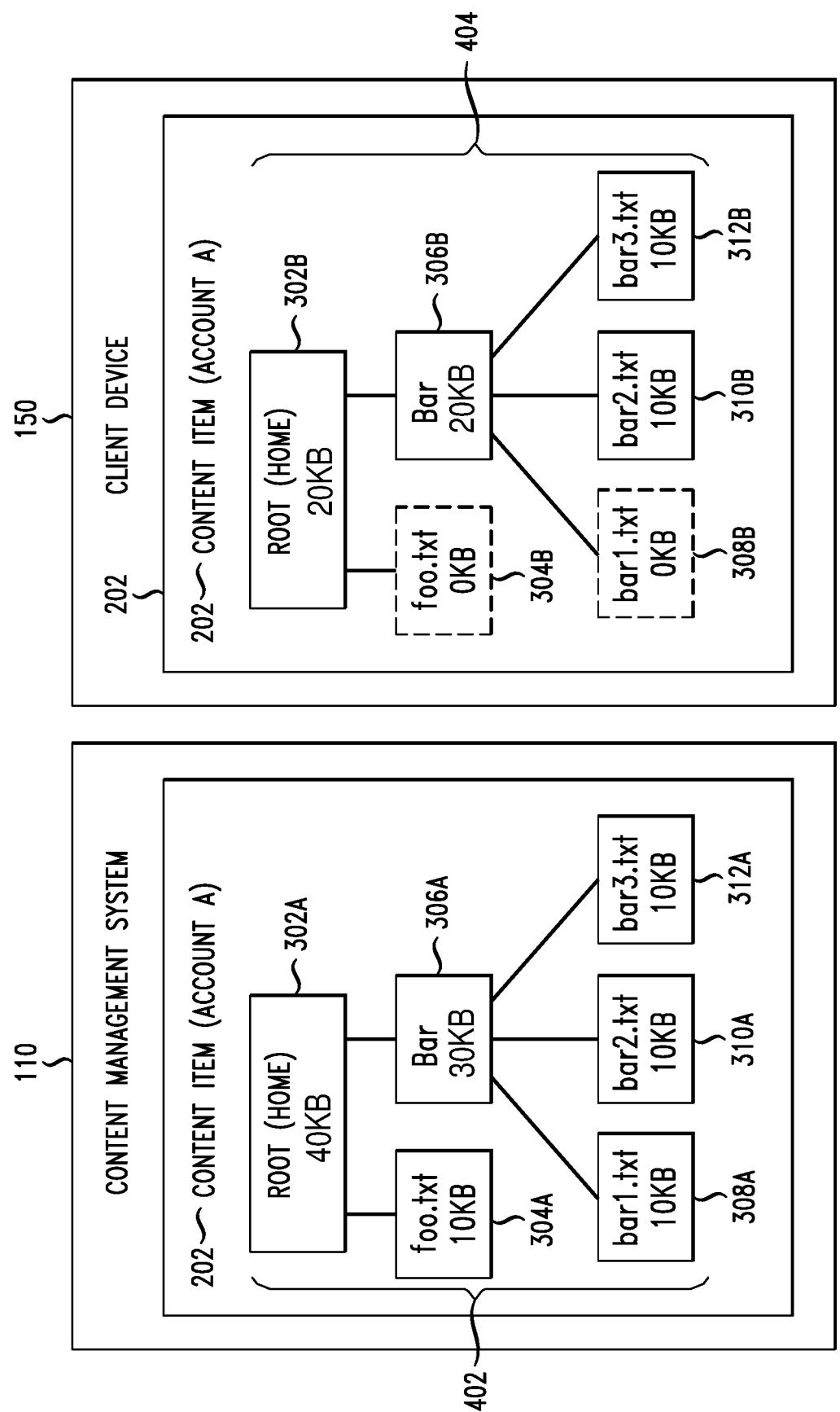
FIG. 4 illustrates example tree data structures for local and online directory structures.

FIG. 4 illustrates example tree data structures for local and online directory structures. In this example, tree data structure 402 represents an online directory structure of content items 202 at content management system, and tree data structure 404 represents a local directory structure of content items 202 at client device 150.

Tree data structure 402 includes root node 302A represents root folder 302 on content management system 110. Root node 302A indicates a total size of root folder 302 of 40 KB. Nodes 304A and 306A are child nodes of root node 302A. Node 304A represents file 304 and node 306A represents folder 306. Node 304A indicates a size of 10 KB for file 304, and node 306A indicates a size of 30 KB.

Nodes 308A, 310A, 312A represent files 308, 310, 312 within folder 306. Accordingly, nodes 308A, 310A, 312A are depicted as child nodes of node 306A. Each of nodes 308A, 310A, 312A indicates a respective size of 10 KB corresponding to files 308, 310, 312.

As illustrated, each node in tree data structure 402 represents a respective content item and indicates a respective size of the respective content item. Thus, tree data structure 402 allows size information about a particular content item to be identified from the corresponding node of the content item without having to query size information for each content item within the content item and calculating a total, combined size. Since tree data structure 402 represents the directory structure of content items 202 at content management system 110, an update to a content item in the directory structure can be propagated to the affected nodes based on the structure of the nodes.

Tree data structure 404 in this example includes local nodes and logical nodes, which represent local content items and online content items within the directory structure of content items 202 at client device 150. Tree data structure 404 includes root node 302B, which represents root folder 302 on client device 150. Root folder 302 is a local content item at client device 150. Thus, root node 302B is depicted as a local node. Root node 302B indicates a total size of root folder 302 of 20 KB. The total size of root folder 302 depicted by root node 302B in tree data structure 404 is less than the total size of root folder 302 depicted by root node 302 in tree data structure 402 because root folder 302 on client device 150 includes online content items that are not locally stored on client device 150, as further described below.

Nodes 304B and 306B are depicted as child nodes of root node 302B. Node 304B represents file 304 and node 306B represents folder 306. Node 304B is depicted as a logical node, which indicates that file 304 is an online content item stored on content management system 110. Node 304B also identifies a size of 0 KB for file 304 on client device 150, which indicates that file 304 is not locally stored at client device 150. Node 306B is depicted as a local node, indicating that folder 306 corresponding to node 306B is locally stored at client device 150, and identifies a size of 20 KB for folder 306 on client device 150, which is based on the size of its child nodes, nodes 308B, 310B, 312B.

Nodes 308B, 310B, 312B represent files 308, 310, 312 within folder 306 corresponding to node 306B. Accordingly, nodes 308B, 310B, 312B are depicted as child nodes of node 306B. Node 308B is depicted as a logical node, indicating that file 308 is an online content item stored at content management system 110, and includes a size of 0 KB for file 308 on client device 150. The size 0 KB indicates that file 308 is not locally stored on client device 150.

Nodes 310B and 312B are local nodes representing files 310 and 312 on client device 150. Nodes 310KB and 312B each indicate a respective size of 10 KB corresponding to files 310 and 312 on client device 150.

As shown in this example, tree data structure 404 represents the directory structure of content items 202, and nodes 302B, 304B, 306B, 308B, 310B, 312B represent content items 202 and incate whether each content item is a local content item or an online content item. Nodes 302B, 304B, 306B, 308B, 310B, 312B also identify the local storage size of each corresponding content item, including content items that are not locally stored.

Tree data structure 404 can thus be used to quickly identify the local storage of a content item based on the size identified by its corresponding node. For example, if client device 150 receives a user request for a total local storage size of root folder 302 on client device 150, client device 150 can simply retrieve the size information from root node 302B, which corresponds to the total local storage size of root folder 302 on client device 150. Client device 150 can obtain the total local storage size of root folder 302 as explained here without having to query a database or data structure for size information for each content item within root folder 302 and calculating a total size for root folder 302 based on the size information of each content item within root folder 302. This approach based on tree data structure 404 can significantly increase the speed and reduce the latency of storage space calculations at client device 150. In some cases, tree data structure 404 can be stored in memory at client device 150 for ever faster access.

Moreover, client device 150 can provide a graphical user interface to present storage space information to a user calculated with this approach based on tree data structure 404. The graphical user interface can display storage space information immediately upon request by the user with minimal or significantly reduced latency, and update the displayed storage space information as the user interacts through the graphical user interface with content items to change or preview storage settings, such as synchronization settings, of content items 202.

Figure 5:
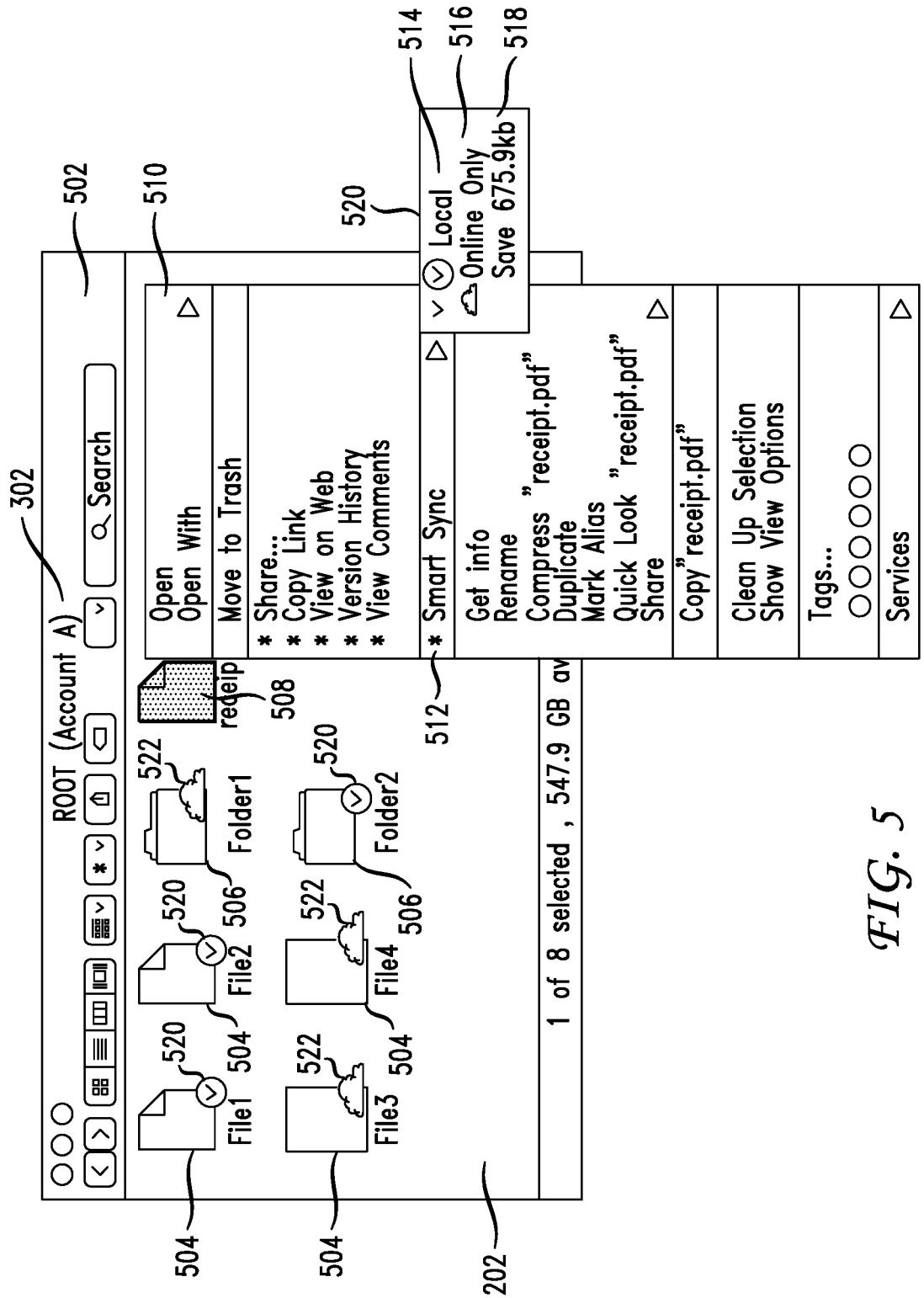
FIG. 5 illustrates an example graphical user interface displaying content items within a root folder in a directory structure.

For example, with reference to FIG. 5, client device 150 can present graphical user interface 502 displaying content items 202 within root folder 302. Graphical user interface 502 can display content items 202 in root folder 302 according to the directory structure of root folder 302, and allow the user to access specific content items and navigate through the directory structure as desired.

In this example, graphical user interface 502 displays files 504, file 508, and folders 506 within root folder 302. Files 504 includes File 1, File 2, File 3, and File 4. Files 504 each include respective synchronization settings 520 or 522. For example, File 1 and File 2 include synchronization setting 520, and File 3 and File 4 include synchronization setting 522. Synchronization setting 520 indicates that the associated content item is stored locally at client device 150 and synchronized with content management system 110. Synchronization setting 522 indicates that the associated content item is an online content item and is not stored locally at client device 150 or set to synchronize. Thus, synchronization setting 520 on File 1 and File 2 indicates that File 1 and File 2 are locally stored at client device 150 and synchronized with content management system. On the other hand, synchronization setting 522 on File 3 and File 4 indicates that File 3 and File 4 are online content items and are not locally stored at client device 150.

Folders 506 include Folder 1 and Folder 2. Folder 1 has synchronization setting 522, indicating that Folder 1 is an online content item and is not stored locally at client device 150, and Folder 2 has synchronization setting 520, indicating that Folder 2 is a local content item and is stored locally and synchronized at client device 150.

File 508 is selected in graphical user interface 502. Graphical user interface 502 displays options menu 510 for file 508, which includes various available properties or options that can be accessed and selected for file 508. Options menu 510 includes synchronization settings 512 for file 508. Synchronization settings 512 can be selected to access synchronization menu 520, which includes synchronization options 514, 516 for file 508.

Synchronization option 514 can be selected for file 508 to enable synchronization and local storage of file 508. Synchronization option 516 can be selected for file 508 to set file 508 as an online content item and disable synchronization and local storage of file 508. Synchronization menu 520 also includes size information 518 for file 508 based on which synchronization option 514, 516 is selected for file 508. In this example, since synchronization option 514 is selected, which enables local storage of file 508, size information 518 indicates the amount of storage space that would be saved if synchronization option 516 is selected and local storage of file 508 is disabled. The amount of storage space saved can be based on the size of file 508. If on the other hand synchronization option 516 is selected, which disables local storage of file 508, size information 518 could indicate an amount of storage space that would be used or required if synchronization option 514 is selected and file 508 is stored locally.

Synchronization menu 520 thus allows a user to not only define specific synchronization and storage preferences for file 508, but also review the storage space utilization or requirement for each synchronization option based on size information 518. A space conscious user can thus intelligently select storage and synchronization files based on size information 518, and avoid inadvertently underconsuming or overconsuming storage space at client device 150. Size information 518 can be obtain from a tree data structure in memory, such as tree data structure 404 as shown in FIG. 4, and displayed with minimal delay, in real-time or near real-time. For example, client device 150 can retrieve size information 518 from a node corresponding to file 508 in a tree data structure representing root folder 302 as depicted in graphical user interface 502, and immediately present size information 518 in synchronization menu 520.

Figure 6A:
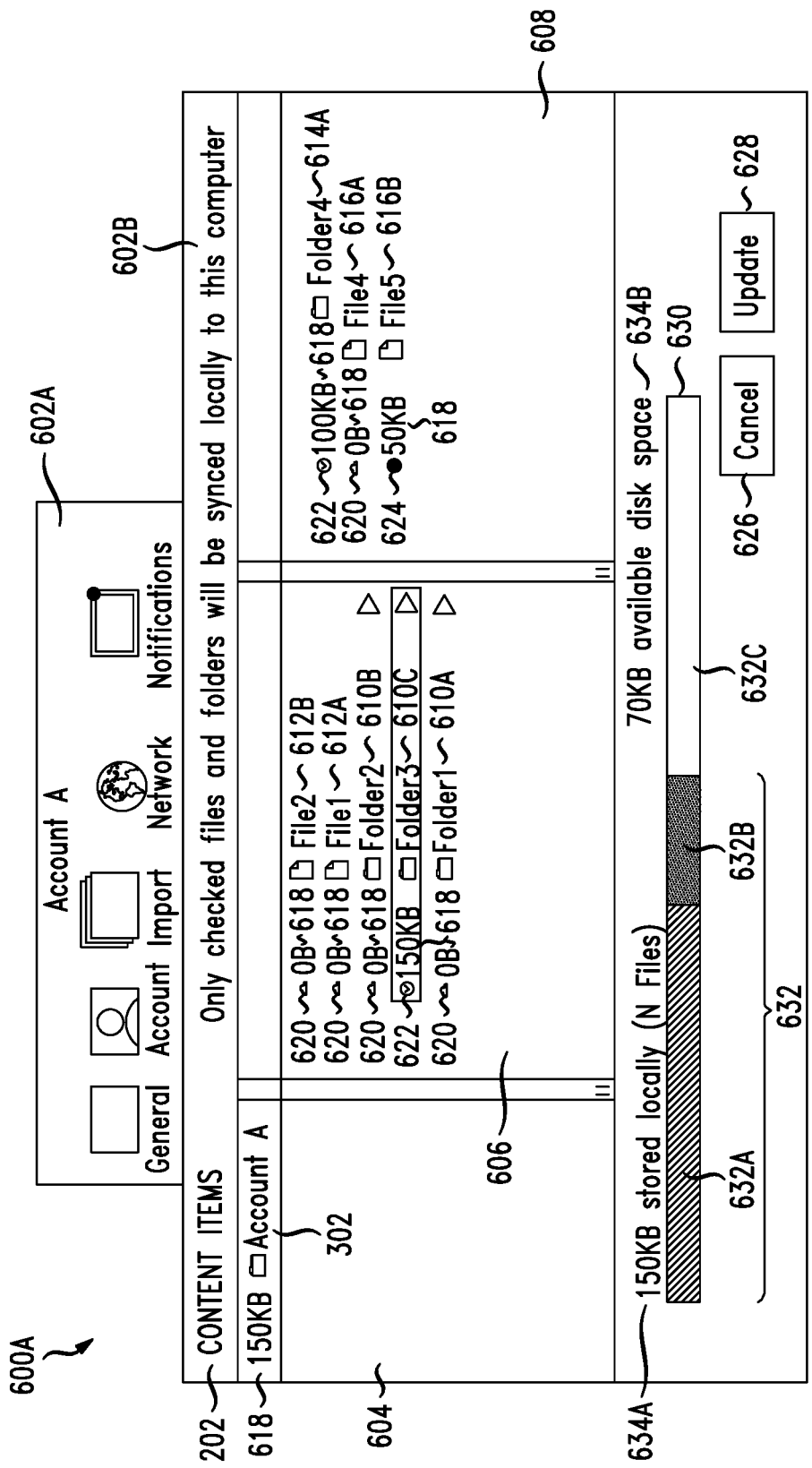
FIG. 6A illustrates an example storage and synchronization management display for viewing, managing, and planning storage and synchronization settings for content items.

FIG. 6A illustrates storage and synchronization management display 600A for viewing, managing, and planning storage and synchronization settings for content items 202. Storage and synchronization management display 600A includes graphical user interface 602B for viewing content items 202 associated with user account A, as well as viewing and modifying storage and synchronization settings of content items 202 on local device 150. Graphical user interface 602B can be access by the user from account settings interface 602 for user account A registered at content management system 110.

Graphical user interface 602B presents content items 202 associated with user account A along with their respective local storage size 618 and respective synchronization settings 620, 622, 624. Graphical user interface 602B can present content items 202 according to their storage organization, such as the directory structure of content items 202 (e.g., directory structure 300). Graphical user interface 602B also allows the user to navigate content items 202 based on the storage organization, and modify respective synchronization settings 620, 622, 624 of selected content items.

For example, graphical user interface 602B can display panels 604, 606, 608 displaying respective content items at each hierarchical level in a directory structure of content items 202. Panel 604 displays root folder 302, which represents the home folder of user account A, and local storage size 618 of root folder 302. In this example, local storage size 618 indicates a size of 150 KB for root folder 302. The 150 KB represents the total local storage space used by root folder 302, which includes the storage space used for all local content items from content items 202 of user account A.

Panel 606 displays files 612A, 612B and folders 610A, 610B, 610C contained within root folder 302 at the next hierarchical level of the directory structure. Panel 606 also displays respective local storage sizes 618 of files 612A, 612B and folders 610A, 610B, 610C. In this example, respective local storage sizes 618 of files 612A, 612B and folders 610A, 610B are 0 KB, which indicates that client device 150 does not store actual data or content of files 612A, 612B and folders 610A, 610B. Respective local storage sizes 618 of folder 610C is 150 KB, which indicates that client device 150 stores 150 KB of data or content for folder 610C.

Panel 606 also displays synchronization settings 620, 622 of files 612A, 612B and folders 610A, 610B, 610C, which indicate the current synchronization and storage settings of each content item. Synchronization setting 620 indicates an associated content item is an online content item that is not locally stored or synchronized at client device 150, and synchronization setting 622 indicates an associated content item is a local content item stored locally and configured to synchronize with content management system 110. In this example, files 612A, 612B and folders 610A, 610B include synchronization setting 620, and folder 610C includes synchronization setting 622. Thus, files 612A, 612B and folders 610A, 610B are online content items which are not stored locally at client device 150, and folder 610C is a local content item stored at client device 150 and configured for synchronization with content management system 110.

Panel 608 displays files 616A, 616B and folder 614A contained within folder 610C at the next hierarchical level of the directory structure. Panel 608 also displays respective local storage sizes 618 of files 616A, 616B and folder 614A. In this example, respective local storage size 618 of file 616A is 0K which indicates that client device 150 does not store actual data or content of file 616A. Moreover, respective local storage sizes 618 of file 616B and folder 614A are 50 KB and 100 KB respectively, which indicates that client device 150 stores 50 KB of data or content for file 616B and 100 KB of data or content for folder 614A.

Panel 608 also displays synchronization settings 620, 622, 624 of files 616A, 616B and folder 614A. File 616A includes synchronization setting 620, indicating that file 616A is an online content item and is not stored locally. Folder 614B includes synchronization setting 622, indicating that folder 614B is a local content item stored locally and configured for synchronization. File 616B includes synchronization setting 624. Synchronization setting 624 indicates that file 616B has been selected to enable synchronization setting 620 for file 616B. Thus, synchronization setting 624 indicates that file 616B is an online content item and the user has selected file 616B to convert it from an online content item to a local content item. When synchronization setting 624 is applied to file 616B, client device 150 will modify the synchronization setting of file 616B from synchronization setting 620 to synchronization setting 622, thus enabling synchronization and local storage of file 616B.

Graphical user interface 602B also presents local storage space usage information, including graphical storage element 630 and storage information 634A and 634B. Graphical storage element 630 can provide a graphical depiction of a total amount of storage space available at client device 150. In FIG. 6A, graphical storage element 630 depicts the total amount of storage space available at client device 150 prior to local storage of any content items 202. Thus, the total amount of storage space used to calculate graphical storage element 630 can represent the total amount of local storage space available for storing content items 202.

Graphical storage element 630 includes first graphical segment 632 and second graphical segment 632C. First graphical segment 632 depicts a first ratio of the total available storage space represented in graphical storage element 630. First graphical segment 632 includes a first subsegment 632A and a second subsegment 632B. First subsegment 632A represents the amount of local storage space currently used by the content items stored locally for user account A, and second subsegment 632B represents the amount of local storage space that would be used by any content items that would be saved locally based on synchronization setting changes selected in graphical user interface 620B.

For example, first subsegment 632A represents the amount of storage space used by folder 610C and folder 614A which are currently stored locally as indicated by synchronization setting 622 and local storage size 618 associated with folders 610C and 614A. Second subsegment 632B represents the amount of local storage space use calculated for file 616B, which has been selected for local storage as illustrated in graphical user interface 620B by synchronization setting 624 and local storage size 618 associated with folders file 616B. Thus, first graphical segment 632 can represent the amount of local storage space used by content items currently stored at client device 150 and the amount of local storage space that would be occupied by the content items that have been newly selected or enabled in graphical user interface 602B for local storage based on synchronization setting 624. Accordingly, the first ratio of storage represented by first graphical segment 632 can be calculated based on synchronization settings 620, 622, 624 as currently set in graphical user interface 602B.

To illustrate, synchronization settings 620 and 622 indicate that client device 150 currently stores 100 KB of content items (i.e., 100 KB for folder 610C based on the 100 KB of local storage space used by folder 614A contained within folder 610C). Synchronization setting 624 indicates that file 616B, which is 50 KB in size, has been selected for synchronization and local storage at client device 150. The 100 KB of local storage space used by content items having synchronization setting 622 (i.e., folder 610C and folder 614A), which is represented by first subsegment 632A, can be added to the 50 KB of local storage space set for use by content items having synchronization setting 624 selected in graphical user interface 602B (i.e., file 616B), which is represented by second subsegment 632A, for a total of 150 KB of local storage space that is used and set to be used based on synchronization settings 620, 622, 624 as currently set in graphical user interface 602B. Thus, the local storage space used to calculate the first ratio represented by first graphical segment 632 is 150 KB, which is also the local storage space calculated for root folder 302 based on synchronization settings 620, 622, 624, as indicated by local storage size 618 associated with root folder 302.

The first ratio represented by first graphical segment 632 can dynamically change as the user modifies synchronization settings 620, 622, 624 for any content items in graphical user interface 602B. For example, if the user deselects synchronization setting 624 for file 616B to change the synchronization setting of file 616B back to synchronization setting 620 and disable local storage of file 616B, the amount of local storage space used to calculate the first ratio can change from 150 KB to 100 KB, reflecting the removal of the 50 KB of file 616B that was set for local storage when synchronization setting 624 was selected. Thus, in response to the user modifying synchronization setting 624 for file 616B, client device 150 can dynamically update the amount of local storage space used calculated based on the current synchronization settings from 150 KB to 100 KB, and recalculate the first ratio represented by first graphical segment 632 to reflect 100 KB of local storage space use instead of 150 KB. Client device 150 can similarly dynamically update local storage information 618 depicted for root folder 302 as changes to synchronization settings 620, 622, 624 occur.

Second graphical segment 632C depicts a second ratio of the total amount of storage space available at client device 150 (i.e., the available storage space used to calculate graphical storage element 630), representing the remaining ratio of storage space available after the first ratio of local storage space represented by first graphical segment 632 is applied to the total amount of storage space available at client device 150. In other words, the second ratio can represent the amount of local storage space available at client device 150 after the local storage space used to calculate the first ratio represented by first graphical segment 632, including the local storage space represented by first subsegment 632 and second subsegment 632B, is subtracted from the total amount of local storage space available and represented by graphical storage element 630.

Like the first ratio represented by first graphical segment 632, the second ratio represented by second graphical segment 632C can also dynamically change when the user modifies synchronization settings 620, 622, 624 for any content items in graphical user interface 602B. For example, as the first ratio changes, the second ratio also changes by an inverse amount. Thus, when graphical user interface 602B updates first graphical segment 632, it also updates second graphical segment 632C by an inverse amount. Accordingly, first graphical segment 632 and second graphical segment 632C in graphical storage element 630 can be graphically updated as synchronization settings 620, 622, 624 are modified and storage space usage and availability are recalculated.

Storage information 634A and 634B presented in graphical user interface 602B can indicate the amount of local storage space use calculated based on synchronization settings 620, 622, 624, and the amount of local storage space available after the amount of local storage space use calculated is applied to the total amount of storage space available at client device 150. In other words, storage information 634A can display the local storage space represented by first graphical segment 632, and storage information 634B can display the available local storage space represented by second graphical segment 632C. Storage information 634A and 634B can also include additional storage information or statistics, such as a number of content items locally stored and/or set to be locally stored for user account A, a total number of content items 202 for user account A (e.g., a total number of local and/or online content items), etc.

Graphical user interface 602B can include buttons 626, 628 for canceling or applying synchronization settings 620, 622, 624 as defined or selected on graphical user interface 602B. For example, graphical user interface 602B can include update button 628 to update synchronization settings 620, 622, 624 based on any changes provided by the user in graphical user interface 602B. To illustrate, as previously mentioned, synchronization setting 624 indicates that the user has enabled synchronization and local storage for the associated content item, which in this example is file 616B. Based on the synchronization change reflected by synchronization setting 624, client device 150 can update the information presented in graphical user interface 602B as previously explained, including storage space and synchronization calculations presented for the current synchronization settings in graphical user interface 602B, including synchronization setting 624. The user can review the information presented in graphical user interface 602B, including the synchronization settings and the storage space information, and select update button 628 to commit to the synchronization settings and storage space information presented in graphical user interface 602B. The user can also make any changes to the synchronization settings and select the update button 628 to commit once the user is finished making changes.

Figure 6B:
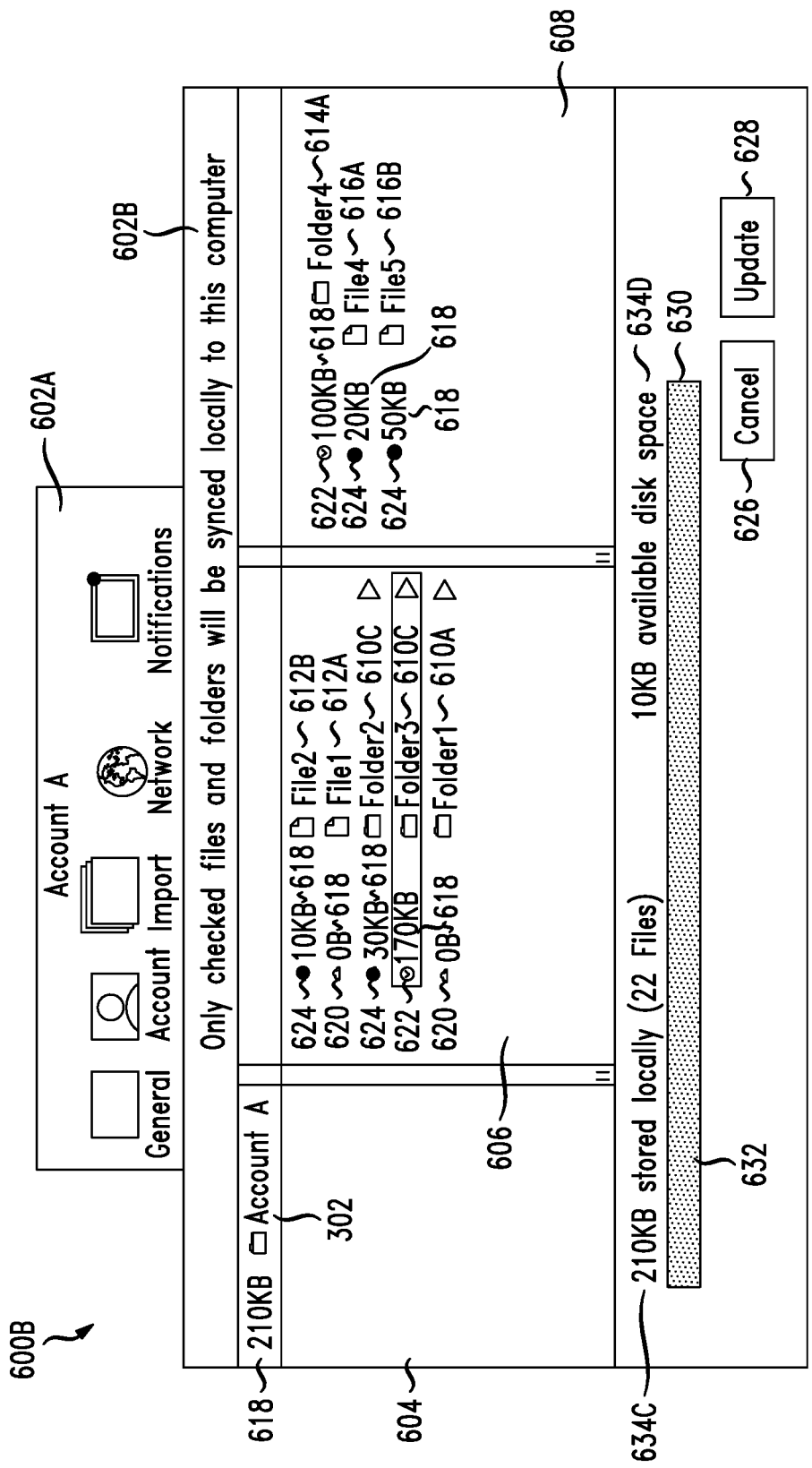
FIG. 6B illustrates example updates to the storage and synchronization management display in FIG. 6A.

FIG. 6B illustrates storage and synchronization management display 600B depicting storage and synchronization updates on graphical user interface 602B. In this example, a user has modified synchronization settings 620, 622, 624 for various content items. For example, synchronization settings 620, 622, 624 have been changed for file 612B, file 616A, and folder 610B to synchronization setting 624, which enables synchronization and local storage for file 612B, file 616A, and folder 610B. In particular, the synchronization settings of file 612B, file 616A, and folder 610B have been changed from synchronization setting 620, which disables synchronization and local storage, to synchronization setting 624, which enables synchronization and local storage.

The user can modify a content item's synchronization setting by selecting that content item in graphical user interface 602B, selecting a respective icon or indicator representing the content item's synchronization setting, right-clicking on the content item or its associated synchronization setting or size information, dragging and dropping the content item or its associated synchronization setting or size information, etc. In some cases, synchronization settings 620, 622, 624 can be visually depicted by respective images, icons, or graphical elements which can be selected to toggle between synchronization settings or storage modes, or selected and deselected to toggle between enabling and disabling synchronization and local storage. For example, a content item's synchronization setting can be modified by selecting an associated checkbox, radio button, radio group, menu item, etc.

As a result of the changes to synchronization settings 620, 622, 624, size information 618 of affected content items can be updated in display 600B based on a calculated local storage size of each affected content item. For example, as previously explained, the synchronization settings of file 612B, file 616A, and folder 610B have been changed from synchronization setting 620 to synchronization setting 624. Thus, file 612B, file 616A, and folder 610B, which were previously disabled from local storage, will now occupy local storage space on client device 150. Accordingly, size information 618 which previously identified in display 600A 0 KB of local storage space use for file 612B, file 616A, and folder 610B, can be updated to reflect the estimated local storage space use of file 612B, file 616A, and folder 610B based synchronization setting 624 enabling local storage of each content item.

The estimated local storage space of each content item can be based on the size of the content item. For example, if the respective size of file 612B, file 616A, and folder 610B is 10 KB, 20 KB, and 30 KB, the estimated local storage space use for file 612B, file 616A, and folder 610B can be 10 KB, 20 KB, and 30 KB, respectively. Thus, size information 618 can be updated for file 612B, file 616A, and folder 610B to 10 KB, 20 KB, and 30 KB, respectively. The change in size information 618 for file 612B, file 616A, and folder 610B can also trigger a change in size information 618 for other content items based on the directory structure of content items 202 as previously explained. For example, size information 618 for folder 610C can be increased to account for the increase in storage space use by file 616A contained within folder 610C, and size information 618 for root folder 302 can be updated to account for the increase of storage space use by folder 610C, folder 610B, and file 612B.

Moreover, graphical storage element 630 and storage information 634A and 634B in display 600A can be updated accordingly, as illustrated by graphical storage element 630 and storage information 634C and 634D in display 600B. For example, graphical storage element 630 and storage information 634A and 634B can be updated to depict the increase in storage space usage created by changing the synchronization settings of file 612B, file 616A, and folder 610B to synchronization setting 624 which enables local storage. In this example, the increase in storage space use results in nearly all available storage space on client device 150 being consumed. First graphical segment 632 has been modified to depict the increase in storage space use which is close to 100% of the total local storage available, represented by graphical storage element 630. Storage information 634C identifies the updated amount of storage space use and the updated number of local content items. Storage information 634D identifies the remaining storage space available on client device 150 calculated based on the updated amount of storage space use.

Client device 150 can update the storage and size information presented on graphical user interface 602B for content items anytime the user modifies synchronization settings, as previously explained. The user can view how local storage space is affected by specific synchronization settings, and toggle between synchronization settings for one or more content items while viewing how the changes to the synchronization settings affect local storage space on client device 150. The user can set specific content items to local content items or online content items as desired, and quickly and easily manage which content items should be stored locally and which should be stored remotely (e.g., at content management system 110). The storage and size information can provide the user indications of the amount of local storage space saved or utilized as synchronization settings are set to enable or disable local storage. The user can obtain a clear and dynamic indication of local storage space availability, usage, etc., and adjust synchronization settings as necessary to achieve a desired result (e.g., local storage space usage, availability, savings, etc.).

Some or all of the information depicted on graphical user interface 602B in display 600A and 600B, such as size information 618, synchronization settings 620, 622, 624, content item names, the directory structure of root folder 302, the storage information (e.g., graphical storage element 630, segments 632, 632A, 632B, 632C, storage information 634A, 634B, 634C, 634D), and/or other content item information presented on graphical user interface 602B can be retrieved from a tree data structure (e.g., tree data structure 320). The tree data structure allows client device 150 to present such information dynamically as requested or modified, with minimal delay. For example, size information 618 can be retrieved from nodes in the tree data structure without querying a database for each content item's size and/or performing size calculations for the content items. The tree data structure can mirror the directory structure of root folder 302 and track the state of content items contained in root folder 302, the size of content items in root folder 302, the local storage space usage, etc., without storing the actual data or content of the content items in root folder 302. The tree data structure can provide quick access to the directory structure information, content item size information, local storage space use information, etc., which can be used to generate and update graphical user interface 602B as described in display 600A and 600B.

In some cases, the tree data structure can be stored in memory on client device 150 for improved performance. Since the tree data structure can be stored without the actual data or content of the content items represented by the tree data structure, the memory footprint of the tree data structure can be small. The tree data structure can be updated as content items and/or synchronization settings are modified. For example, a synchronization setting modification to a content item can trigger an update to a node corresponding to that content item. The update can identify the new synchronization setting for that content item and any changes in the size or storage space use associated with that content item. The update can be propagated to other nodes in the tree data structure that would be affected by the update, including each parent node of the content item's node and any subsequent parent nodes up to the root folder 302.

Figure 7:
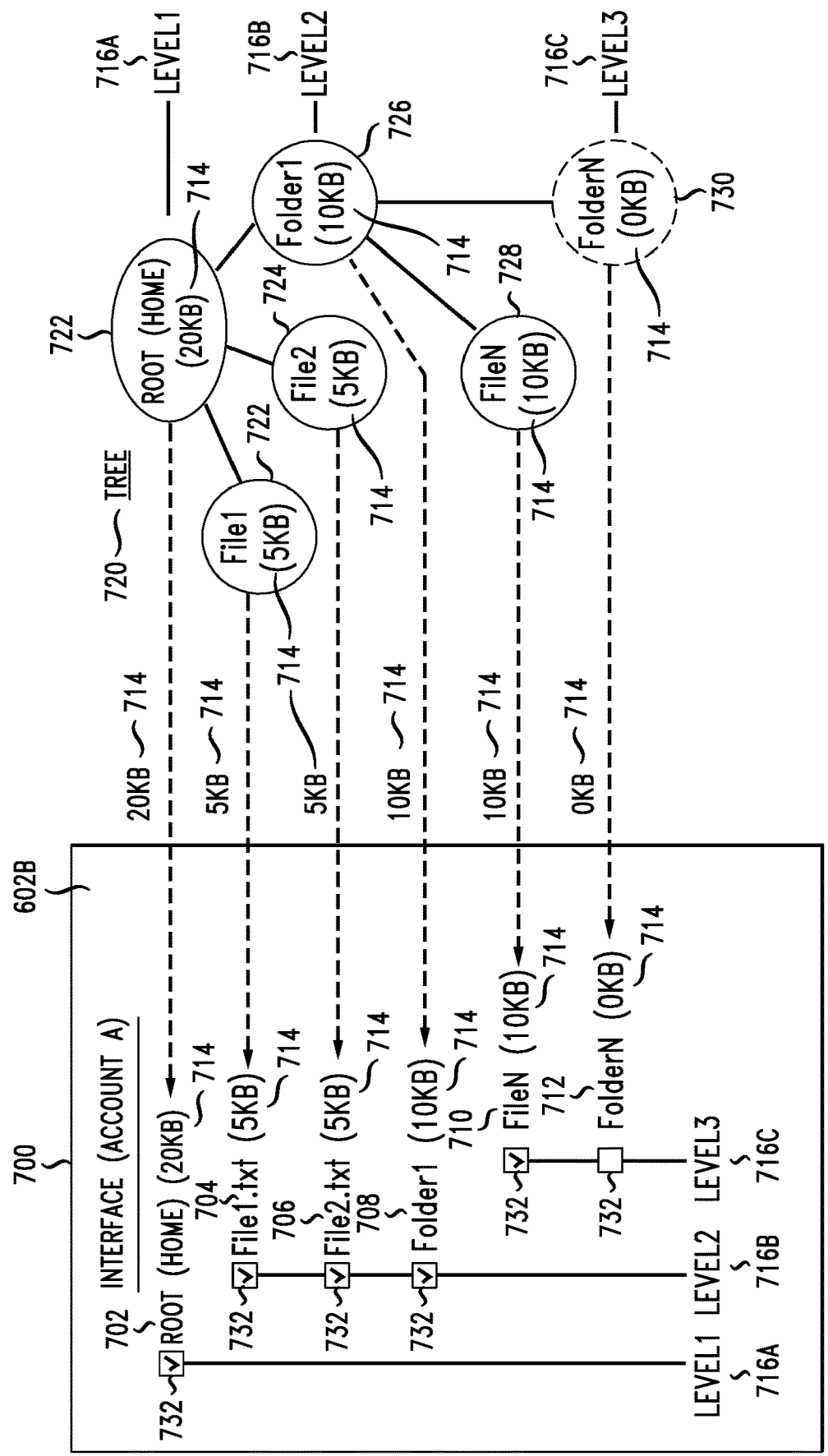
FIG. 7 illustrates a diagram mapping content items and updates for a directory structure depicted on a graphical user interface to a corresponding tree data structure.

FIG. 7 illustrates a diagram mapping content items and updates for directory structure 700 depicted in graphical user interface 602B to tree data structure 720. Tree data structure 720 can mirror a directory structure of content items 202 and track content item information, such as size, name, location, etc. Tree data structure 720 can be used to generate and/or update directory structure 700 in presented in graphical user interface 602B. Directory structure 700 depicts a hierarchical organization of content items displayed in graphical user interface 602B based on tree data structure 720.

Tree data structure 720 includes root node 722 at level 1 (716A). Root node 722 includes size information 714 identifying a size or storage space of root node 722. In this example, size information 714 of root node 722 indicates that root node 722 is 20 KB.

Tree data structure 720 also includes nodes 722, 724, 726 at level 2 (716B), which are child nodes of root node 722. Node 722 represents File 1 and includes size information 714 indicating that File 1 is 5 KB. Node 724 represents File 2 and includes size information 714 indicating that File 2 is 5 KB. Node 726 represents Folder 1 and includes size information 714 indicating that Folder 1 is 10 KB.

Tree data structure also includes nodes 728 and 730 at level 3 (716C), which are child nodes of node 726. Node 728 represents File N and includes size information 714 indicating that File N is 10 KB. Node 728 represents Folder N and includes size information 714 indicating that Folder N is 0 KB, as it is an online content item and is not stored locally on client device 150.

The 20 KB size of root node 722 reflects the size of its child nodes (e.g., nodes at level 2), which in this example include 5 KB for node 722, 5 KB for node 724, and 10 KB for node 726. Similarly, the size of any other node having one or more child nodes will reflect the size of the one or more child nodes of that node (e.g., nodes in lower levels having a connection or relationship to the node). For example, node 726 is at level 2 (716B) and has child nodes (e.g., nodes connected to node 726 from a lower level than node 726), including nodes 728 and 730 at level 3 (716C). The 10 KB size of node 726 reflects the size of child nodes 728 and 730, which in this example include 10 KB for node 728 and 0 KB for node 730. In this way, the size information of child nodes is reflected in the parent nodes (e.g., connected nodes in upper levels). When a child node is updated, the update can be propagated to any parent nodes. For example, when a node at level x is updated, the updates can be propagated to any nodes connected to that node at level x-1, and the updates can continue to be propagated to connected nodes in upper levels.

To illustrate, if the synchronization setting of node 730 at level 3 (716C), which is a child of node 726 and currently configured as an online content item with a local size of 0 KB, is modified to convert node 730 into a local content item and store its content locally, the size of node 730 can be updated based on the size or storage space calculated for local storage of Folder N represented by node 730. Assume in this example that the size for local storage of Folder N is 10 KB. Size information 714 for node 730 would consequently be updated to 10 KB, reflecting the space on local storage used or estimated for Folder N. Node 730 is a child of node 726 as node 730 resides at level 3 (716C) and is connected to node 726 at level 2 (716B). Accordingly, the update in size information 714 for node 730 can be propagated to node 726, resulting in an update to size information 714 of node 726. Here, the 10 KB added to node 730 would be added to node 726, and size information 714 of node 726 would be increased from 10 KB to 20 KB in order to account for the 10 KB increase resulting from local storage of Folder N.

Node 726 is a child of root node 722, as node 726 resides at level 2 (716B) and is connected to root node 722 which resides at at level 1 (716A). Accordingly, the 10 KB propagated to node 726 would be further propagated to root node 722. Thus, size information 714 of root node 722 would be increased from 20 KB to 30 KB, reflecting the 10 KB increase at node 726. As content items and synchronization settings change, tree data structure 720 can be updated to reflect such changes and reflect current information. Such changes can be dynamic and/or instantaneous.

Tree data structure 720 can be used to generate and/or update directory structure 700 on graphical user interface 602B. For example, root folder 702 resides in level 1 (716A) of directory structure 700 and corresponds to root node 722 at level 1 (716A) in tree data structure 722. Root folder 702 can track root node 722 and any information included at root node 722, such as size information 714 at root node 722 and the organizational structure of root node 722. Root node 722 has child nodes residing at level 2 (716B), including nodes 722, 724, 726. Accordingly, root folder 702 has subitems 704, 706, 708 at level 2 (716B) of directory structure 700, which correspond to nodes 722, 724, 726 at level 2 (716B) of tree data structure 722. Subitems 704, 706, 708 can inherit properties or information from nodes 722, 724, 726, such as size information 714, a respective name, a respective organizational structure, etc. For example, subitem 704 is a 5 KB file named File 1, subitem 706 is a 5 KB file named File 2, and subitem 708 is a 10 KB folder named Folder 1.

Node 726 in tree data structure 720 resides at level 2 (716B) and has child nodes 728 and 730 at level 3 (716C). Accordingly, subitem 708 at level 2 (716B) in directory structure 700 includes subitems 710 and 712 at level 3 (716C) of directory structure 700, corresponding to nodes 728 and 730 at level 3 (716C) of tree data structure 722. Subitems 710 and 712 in directory structure 700 can inherit properties or information from nodes 728 and 730 in tree data structure 722. For example, consistent with nodes 728 and 730, subitem 710 is a 10 KB file named File N and subitem 712 is a 0 KB folder named Folder N. The 0 KB size of subitem 712 indicates that subitem 712 is an online content item and is not store locally at client device 150.

Content items 702, 704, 706, 708, 710, 712 in directory structure 700 can include synchronization settings 732. Synchronization settings 732 indicate whether each content item is an online content item or a local content item. Thus, synchronization settings 732 indicate whether each content item is stored locally or remotely. Synchronization settings 732 can be obtained from nodes 722, 724, 726, 728, 730 in tree directory structure 720 and/or can be directly obtained from a user input at graphical user interface 602B.

For example, synchronization settings 732 are depicted in this example as checkboxes. A check in a checkbox indicates that local storage and synchronization has been enabled for the content item associated with that checkbox. Alternatively, an unchecked checkbox indicates that local storage and synchronization has been disabled for that content item. Accordingly, as illustrated in directory structure 700, synchronization settings 732 indicate that all content items in directory structure 700 except subitem 712 (i.e., Folder N)

have been set for local storage and synchronization. A user can select and deselect synchronization settings 732 to enable and disable local storage and synchronization for specific content items in directory structure 700. As synchronization settings 732 are modified, the modified synchronization settings can be used to update tree data structure 720.

Moreover, tree data structure 720 can be used to update information displayed on graphical user interface 602B for directory structure 700, including content item size or storage use, local storage space use, local storage space availability, etc., as previously described with respect to FIGS. 6A and 6B. For example, when one or more synchronization settings 732 are modified through graphical user interface 602B, the synchronization setting updates can be used to update tree data structure 720. Updated storage and content item size information can then be retrieved from tree data structure 720 and presented at graphical user interface 602B. Directory structure 700 on graphical user interface 602B can thus be updated as changes occur based on tree data structure 720.

Figure 8:
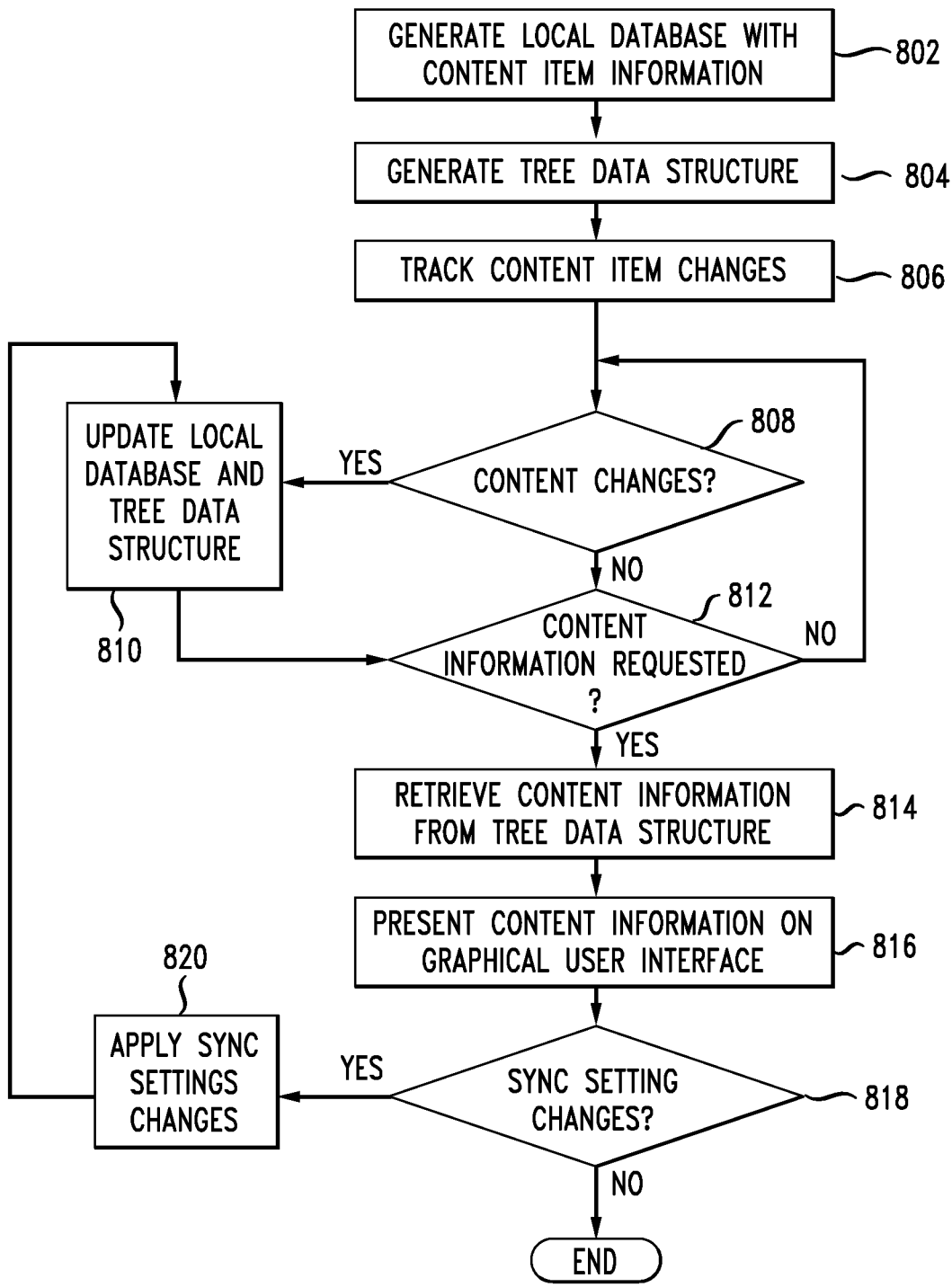
FIG. 8 illustrates a flowchart of an example process for managing storage and synchronization settings on a client device.

FIG. 8 illustrates an example flowchart for managing storage space information at client device 150. At step 802, client device 150 can generate a local database (e.g., local database 204) with content information about content items of a user account (e.g., content items 202 stored for user account A at content management system 110). The content information can include, for example, size information (e.g., file sizes), names (e.g., filenames), content locations (e.g., local client device 150, content management system 110, etc.), content paths (e.g., URI, URL, relative paths, etc.), directories (e.g., parent directories, subdirectories, etc.), synchronization information (e.g., local storage and synchronization, online storage), properties (e.g., local content item, online content item, file type, etc.), and so forth.

At step 804, client device 150 can generate a tree data structure (e.g., tree data structure 206, 320, or 720) based on the local database. The tree data structure can include nodes representing the content items identified in the local database. The nodes can be organized according to a storage organization (e.g., directory structure 300 or 700) of the content items identified based on the information in the local database. The nodes can include the respective content information in local database for the content items corresponding to the nodes, such as names, sizes, paths, directories, synchronization information, etc.

At step 804, the content items of the user account can be tracked for changes, such as changes to synchronization settings or changes to the content items and/or associated data content (e.g., content item add, content item delete, content item write, etc.). If changes are detected, at step 810 client device 150 can update the local database and/or tree data structure to reflect the detected update before proceeding to step 812.

At step 812, client device 150 can determine if content information has been requested. For example, client device 150 can determine if a user has requested size or synchronization information for one or more content items (e.g., synchronization menu 520) or requested presentation of the content items and corresponding storage and synchronization settings (e.g., graphical user interface 602B). If no content information has been requested, client device 150 can continue to track changes at step 806.

At step 814, if content information is requested, client device 150 can retrieve content information from the tree data structure and, at step 816, present the content information on a graphical user interface (e.g., graphical user interface 502 or 602B). At step 816, client device 150 can check if synchronization settings have been changed for any content items presented on the graphical user interface. At step 820, if client device 150 detects any changes to synchronization settings, client device 150 can apply the synchronization setting changes. Once the synchronization setting changes have been applied, client device 150 can return to step 810, and update the local database and/or tree data structure based on the synchronization setting changes.

Figure 9:
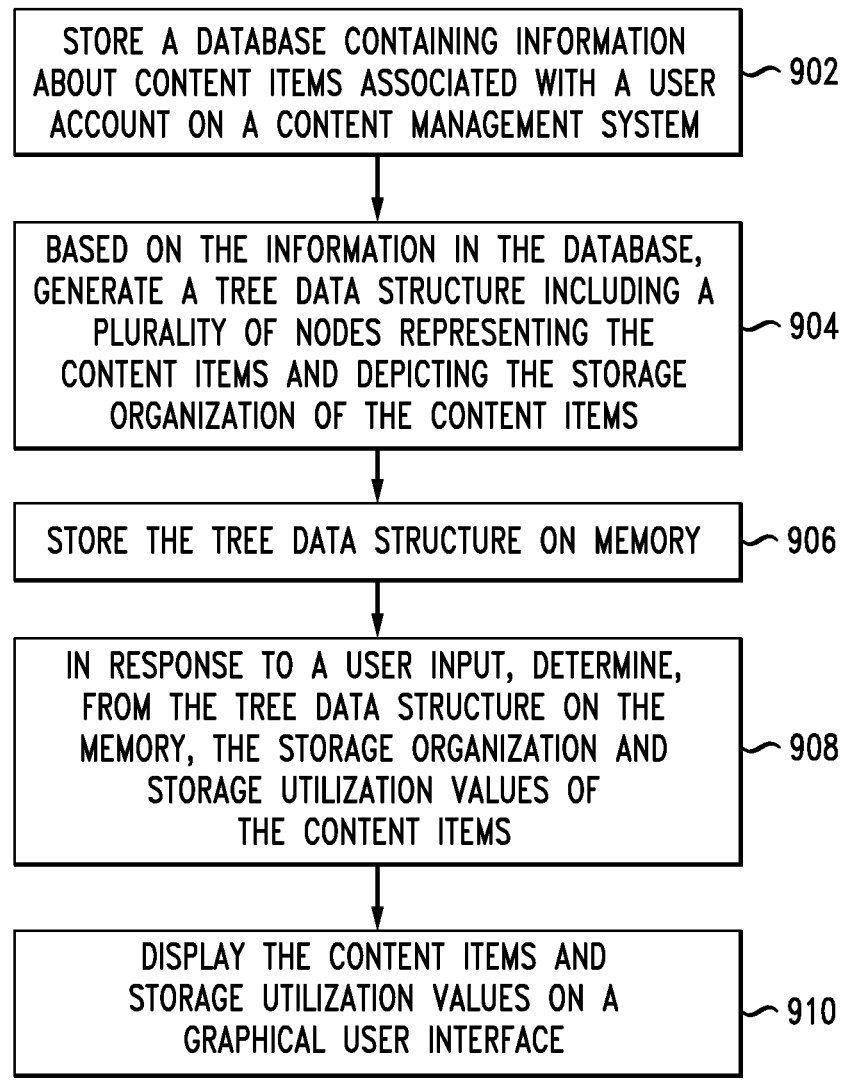
FIG. 9 illustrates an example method for tracking and managing storage and synchronization information for content items.
Figure 10:
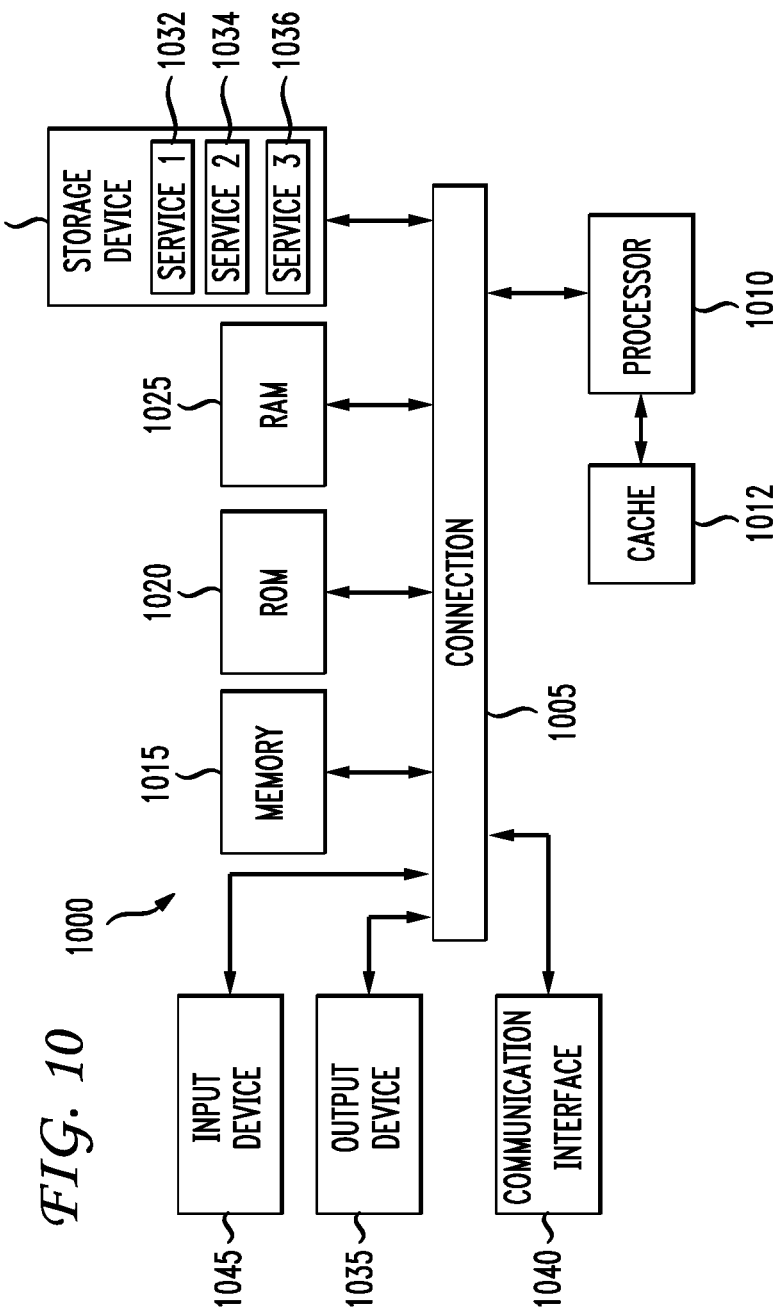
FIG. 10 illustrates an example system embodiment.

FIG. 9 illustrates an example method for tracking and managing storage and synchronization information for content items. At step 902, client device 150 can store a database (e.g., local database 204) containing information about content items associated with a user account registered with a content management system. The information can include size information for the content items (e.g., data or storage sizes), a storage organization information (e.g., directory structure) of the content items, filenames, paths, location information, and other file information.

Based on the information in the database, at step 904, client device 150 can generate a tree data structure (e.g., tree data structure 206, 320, or 722) including a plurality of nodes representing the content items and depicting the storage organization (e.g., directory structure) of the content items. The plurality of nodes can include storage utilization values associated with the content items (e.g., data storage sizes). The storage utilization values for the nodes can be based on the respective data sizes of the corresponding content items, which can be retrieved from the database.

At step 906, client device 150 can store the tree data structure on memory. Storing the tree data structure on memory can allow faster access times for the information in tree data structure when needed. In some cases, however, depending on the performance needs of a particular implementation, client device 150 can store the tree data structure on persistent storage or cache.

In response to a user input, at step 908, client device 150 can determine, from the tree data structure, the storage organization of the content items and the storage utilization values. The user input can be, for example, a request to view storage information for one or more content items, a request to access synchronization settings for one or more content items, a request to navigate a directory structure of the content items and view storage space information for the content items and storage conditions at client device 150, a request to access the user's account and view content items and storage settings, etc.

At step 910, client device 150 can display the content items and storage utilization values on a graphical user interface (e.g., graphical user interface 602B). For example, client device 150 can retrieve content item information from the tree data structure and use the information to generate the graphical user interface and present the content items and associated information.

Client device 150 can display the content items on the graphical user interface according to the storage organization (e.g., directory structure) of the content items, and can present storage and synchronization information for the content items and/or client device 150, such as individual synchronization settings, individual storage use by each content item, combined storage use by the content items based on current synchronization settings, amount of local storage space saved or reduced based on the current synchronization settings, total amount of local storage space available, file count information indicating the number of files stored locally and/or remotely, data size of content items stored remotely, etc.

Client device 150 can receive additional input through the graphical user interface, such as synchronization setting changes, and update the graphical user interface based on the changes to display updated content item information, such as updated storage settings, updated local storage utilization (individual and/or combined), updated local storage space availability, etc. To update the graphical user interface, client device 150 can retrieve node information from the tree data structure as necessary for quick or instantenous presentation of the information without having to query rows in a database and perform calculations based on the query results.

Client device 150 can also update the tree data structure based on any user input received, such as synchronization settings to maintain the tree data structure current. For example, each node in the tree data structure can contain a data size of a corresponding content item and a synchronization setting. If a content item is set as an online content item, the graphical user interface may indicate that the online content item is not occupying local storage space.

For example, content item can be depicted with a OB size on client device 150. If a user makes a change to the synchronization setting of that content item to enable local storage of that content item, client device 150 can access the tree data structure to toggle the storage setting of that content item from online to local. The tree data structure can contain the data size of the content item. Thus, the tree data structure can be updated to reflect a local storage utilization for that content item based on the data size of that content item. The local storage utilization added for that content item can be propagated to any parent nodes to update the tree data structure. Client device 150 can then retrieve the storage information from the updatd tree data structure and present the updated information in the graphical user interface. The graphical user interface can then reflect the changes requested by the user.

Using the tree data structure, client device 150 can avoid having to query the database every time content item, size, and storage information is requested. This can greatly increase the response time for providing such requested information to a user. As previously mentioned, the tree data structure can also be stored in memory for faster access. Here, client device 150 can query the database an initial time to generate the tree data structure, but avoid querying the database for requests once the tree has been generated and stored in memory.

In some cases, client device 150 may generate the tree data structure when client application 152 is first launched on client device 150. Thus, client device 150 may only query the database to generate the tree data structure during the period when client application 152 is being launched, which the user may already expect some delays associated with the launching of an application. Thereafter, client device 150 can obtain content item information, such as size, name, path, organization structure, directories, etc., from the tree data structure on memory without having to query the database and experience delays from the database queries.

Database queries, such as SQL queries, can be time consuming. Calculating query results to present specific information can add further delays. For example, querying the database on client device 150 (or any other database) for size and storage information, and calculating the queried results to content item size and storage information requested by a user can be a slow and inefficient process with annoying delays for the user. The approaches herein can avoid these delays and inefficiencies. As previously mentioned, instead of querying the local database (or any other database) for size and storage information when a user requests such information, client device 150 can quickly retrieve the content, size, and storage information requested from the tree data structure in memory.

Client device 150 can also dynamically present updated information as the user interacts with the information and makes changes to the settings, by interacting with the tree data structure containing the content item information and maintaining the tree data structure updated through efficient propagation of information to nodes in the tree. The user can thus manage synchronization settings and local storage for a user account, and plan or preview the implications of different settings dynamically as the user interacts with the graphical user interface on client device 150.

FIG. 10 illustrates an example computing system architecture 1000 wherein the components of the system are in communication with each other using a connection 1005. Connection 1005 can be a physical connection via a bus, or direct connection into processor 1010 such as in a chipset architecture. Connection 1005 can also be a virtual connection, networked connection, or logical connection.

In some embodiments 1000 is a distributed system, wherein the functions described with respect to the components herein can be distributed within a datacenter, multiple datacenters, geographically, etc. In some embodiments, one or more of the described system components represents many such components each performing some or all of the function for which the component is described. In some embodiments, the components described herein can be physical or virtual devices.

Example system 1000 includes at least one processing unit (CPU or processor) 1010 and a connection 1005 that couples various system components including the system memory 1015, such as read only memory (ROM) and random access memory (RAM) to the processor 1010. The system 1000 can include a cache of high-speed memory connected directly with, in close proximity to, or integrated as part of the processor 1010.

The processor 1010 can include any general purpose processor and a hardware service or software service, such as service 1 1032, service 2 1034, and service 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as the processor 1010, bus 1005, output device 1035, and so forth, to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The description and drawings herein are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or any example term. Likewise, the disclosure is not limited to various embodiments given in this specification.

As used herein, claim language reciting "at least one of" a first item "and" a second item indicates that the first item, the second item, or both the first and second item satisfy the claim. For example, claim language reciting "at least one of A and B" indicates that either a set of A or B (e.g., A only or B only) or a set of A and B (e.g., both A and B) can satisfy the claim.

What is claimed is:
1. A method comprising:
   storing, at a client device associated with a user account on a content management system, a database containing information about content items associated with the user account, the information identifying a storage organization of the content items and respective data sizes associated with the content items stored on the content management system;

based at least in part on the information in the database, generating a tree data structure comprising a plurality of nodes representing the content items and depicting the storage organization of the content items, the plurality of nodes identifying storage utilization values associated with the content items, the storage utilization values comprising a first set of storage utilization values corresponding to a first set of the respective content items stored on both the client device and the content management system, and a second set of storage utilization values corresponding to a second set of the respective content items stored on the content management system but not on the client device, the first set of storage utilization values indicating the respective data sizes of the first set of the respective content items, and the second set of storage utilization values being set to a same predefined value for each content item in the second set of respective content items indicating that each content item in the second set of the respective content items is not stored on the client device;

storing the tree data structure on a memory of the client device; and displaying at least some of the content items in their storage organization depicted in the tree data structure with respective storage utilization values associated with the content items stored on the content management system in a graphical user interface at the client device.

2. The method of claim 1, further comprising:
displaying a comparison between a total storage space used by the content items stored at the content management system and storage space used by a portion of the content items that are locally stored at the client device.

3. The method of claim 1, further comprising:
identifying a set of local content items comprising those of the content items stored locally at the client device;
identifying a set of nodes in the tree data structure corresponding to the set of local content items;
based on the set of nodes, determining a total local storage utilization value associated with the set of local content items; and
displaying, on the graphical user interface, an indication of a total amount of local storage space utilization associated with the content items, the total amount of local storage space being based on the total local storage utilization value.

4. The method of claim 3, further comprising:
retrieving, from the set of nodes, a respective storage utilization value of each local content item in the set of local content items; and
displaying, on the graphical user interface, each local content item with a second indication of a respective amount of local storage space occupied by the local content item on the client device, the respective amount of local storage space being based on the respective storage utilization value.

5. The method of claim 4, further comprising:
identifying a set of online content items comprising those of the content items that are not locally stored at the client device; and
displaying, on the graphical user interface, each online content item from the set of online content items with a third indication that the online content item is not locally stored at the client device.

6. The method of claim 3, further comprising:
receiving, via the graphical user interface, user input defining synchronization settings associated with the content items, each of the synchronization settings enabling or disabling a local storage preference;
determining an updated set of local content items comprising those of the content items having a synchronization setting enabling the local storage preference;
obtaining, from the tree data structure, an updated total local storage utilization value associated with the updated set of local content items; and
displaying, on the graphical user interface, a second indication of an updated total amount of local storage space associated with the content items based on the updated total local storage utilization value.

7. The method of claim 6, further comprising:
identifying an updated set of nodes in the tree data structure, the updated set of nodes corresponding to the updated set of local content items;
retrieving, from the updated set of nodes in the tree data structure, a respective storage utilization value of each local content item in the updated set of local content items, the respective storage utilization value being based on a respective data size of the local content item; and
displaying, on the graphical user interface, each local content item in the updated set of local content items with a respective indication of the respective storage utilization value.

8. The method of claim 1, the plurality of nodes being interconnected in an organizational structure representing the storage organization of the content items, the method further comprising:
based on one or more changes to one or more content items associated with the user account, updating the database to include updated information reflecting the one or more changes to the one or more content items;
updating the tree data structure based on the updated information to yield an updated tree data structure, the updated tree data structure reflecting the one or more changes to the one or more content items;
obtaining, from the updated tree data structure, a current storage organization of content items currently associated with the user account and current respective storage utilization values associated with the content items currently associated with the user account; and
displaying, on the graphical user interface, the content items currently associated with the user account and the current respective storage utilization values, the content items being currently associated with the user account being displayed according to the current storage organization of content items.

9. The method of claim 8, wherein updating the tree data structure comprises:
for each of the one or more content items associated with the one or more changes, identifying a respective node in the tree data structure representing the content item;
modifying the respective node based on at least a portion of the updated information to yield a respective node update, the respective node update reflecting at least a portion of the one or more changes pertaining to the content item represented by the respective node;
determining a respective path in the tree data structure traversing to a root node of the tree data structure from the respective node; and propagating the respective node update to every node in the path.

10. A non-transitory computer-readable medium comprising:
instructions stored therein which, when executed by one or more processors, cause the one or more processors to:
store, at a client device associated with a user account on a content management system, a database containing information about content items associated with the user account, the information identifying a storage organization of the content items and respective data sizes associated with the content items stored on the content management system;
based at least in part on the information in the database, generate a tree data structure comprising a plurality of nodes representing the content items and depicting the storage organization of the content items, the plurality of nodes identifying storage utilization values associated with the content items, the storage utilization values comprising a first set of storage utilization values corresponding to a first set of the respective content items stored on both the client device and the content management system, and a second set of storage utilization values corresponding to a second set of the respective content items stored on the content management system but not on the client device, the first set of storage utilization values indicating the respective data sizes of the first set of the respective content items, and the second set of storage utilization values being set to a same predefined value for each content item of the second set of respective content items indicating that each content item in the second set of the respective content items is not stored on the client;
store the tree data structure on a memory of the client device; and
display at least some of the content items in their storage organization depicted in the tree data structure with respective storage utilization values associated with the content items stored on the content management system in a graphical user interface at the client device.

11. The non-transitory computer-readable medium of claim 10, further comprising:
displaying a comparison between a total storage space used by the content items stored at the content management system and storage space used by a portion of the content items that are locally stored at the client device.

12. The non-transitory computer-readable medium of claim 10, storing additional instructions which, when executed by the one or more processors, cause the one or more processors to:
identify a set of local content items comprising those of the content items stored locally at the client device;
identify a set of nodes in the tree data structure corresponding to the set of local content items;
based on the set of nodes, determine a total local storage utilization value associated with the set of local content items; and
display, on the graphical user interface, an indication of a total amount of local storage space utilization associated with the content items, the total amount of local storage space being based on the total local storage utilization value.

13. The non-transitory computer-readable medium of claim 12, storing additional instructions which, when executed by the one or more processors, cause the one or more processors to:
retrieve, from the set of nodes, a respective storage utilization value of each local content item in the set of local content items;
identify a set of online content items comprising those of the content items that are not locally stored at the client device; and
display, on the graphical user interface:
each local content item with a second indication of a respective amount of local storage space occupied by the local content item on the client device, the respective amount of local storage space being based on the respective storage utilization value; and
each online content item from the set of online content items with a third indication that the online content item is not locally stored at the client device.

14. The non-transitory computer-readable medium of claim 12, storing additional instructions which, when executed by the one or more processors, cause the one or more processors to:
receive, via the graphical user interface, user input defining synchronization settings associated with the content items, each of the synchronization settings enabling or disabling a local storage preference;
determine an updated set of local content items comprising those of the content items having a synchronization setting enabling the local storage preference;
obtain, from the tree data structure, an updated total local storage utilization value associated with the updated set of local content items; and
display, on the graphical user interface, a second indication of an updated total amount of local storage space associated with the content items based on the updated total local storage utilization value.

15. The non-transitory computer-readable medium of claim 10, the plurality of nodes being interconnected in an organizational structure representing the storage organization of the content items, the non-transitory computer-readable medium storing additional instructions which, when executed by the one or more processors, cause the one or more processors to:
based on one or more changes to one or more content items associated with the user account, update the database to include updated information reflecting the one or more changes to the one or more content items;
update the tree data structure based on the updated information to yield an updated tree data structure, the updated tree data structure reflecting the one or more changes to the one or more content items;
obtain, from the updated tree data structure, a current storage organization of content items currently associated with the user account and current respective storage utilization values associated with the content items currently associated with the user account; and
display, on the graphical user interface, the content items currently associated with the user account and the current respective storage utilization values, the content items being currently associated with the user account being displayed according to the current storage organization of content items.

16. A system comprising:
one or more processors; and at least one computer-readable storage medium having stored therein instructions which, when executed by the one or more processors, cause the system to:

store a database containing information about content items associated with a user account on a content management system, the information identifying a storage organization of the content items and respective data sizes associated with the content items stored on the content management system;

based at least in part on the information in the database, generate a tree data structure comprising a plurality of nodes representing the content items and depicting the storage organization of the content items, the plurality of nodes identifying storage utilization values associated with the content items, the storage utilization values comprising a first set of storage utilization values corresponding to a first set of the respective content items stored on both a client device and the content management system, and a second set of storage utilization values corresponding to a second set of the respective content items stored on the content management system but not on the client device, the first set of storage utilization values indicating the respective data sizes of the first set of the respective content items, and the second set of storage utilization values being set to a same predefined value for each content item in the second set of respective content items indicating that each content item in the second set of the respective content items is not stored on the client device;

store the tree data structure on a memory of the system; and display at least some of the content items in their storage organization depicted in the tree data structure with respective storage utilization values associated with the content items stored on the content management system in a graphical user interface at the client device.

17. The system of claim 16, the at least one computer-readable storage medium storing additional instructions which, when executed by the one or more processors, cause the system to:

based on one or more changes to one or more content items associated with the user account, update the database to include updated information reflecting the one or more changes to the one or more content items;

update the tree data structure based on the updated information to yield an updated tree data structure, the updated tree data structure reflecting the one or more changes to the one or more content items;

obtain, from the updated tree data structure, a current storage organization of content items currently associated with the user account and current respective storage utilization values associated with the content items currently associated with the user account; and display, on the graphical user interface, the content items currently associated with the user account and the current respective storage utilization values, the content items being currently associated with the user account being displayed according to the current storage organization of content items.

18. The system of claim 17, wherein updating the tree data structure comprises:

for each of the one or more content items associated with the one or more changes, identifying a respective node in the tree data structure representing the content item;

modifying the respective node based on at least a portion of the updated information to yield a respective node update, the respective node update reflecting at least a portion of the one or more changes pertaining to the content item represented by the respective node;

determining a respective path in the tree data structure traversing to a root node of the tree data structure from the respective node; and propagating the respective node update to every node in the path.

19. The system of claim 16, the at least one computer-readable storage medium storing additional instructions which, when executed by the one or more processors, cause the system to:

identify a set of local content items comprising those of the content items stored locally at the system;

identify a set of nodes in the tree data structure corresponding to the set of local content items;

based on the set of nodes, determine a total local storage utilization value associated with the set of local content items; and display, on the graphical user interface, an indication of a total amount of local storage space utilization associated with the content items, the total amount of local storage space being based on the total local storage utilization value.

20. The system of claim 19, the at least one computer-readable storage medium storing additional instructions which, when executed by the one or more processors, cause the system to:

receive, via the graphical user interface, user input defining synchronization settings associated with the content items, each of the synchronization settings enabling or disabling a local storage preference;

determine an updated set of local content items comprising those of the content items having a synchronization setting enabling the local storage preference;

obtain, from the tree data structure, an updated total local storage utilization value associated with the updated set of local content items based on an updated set of nodes in the tree data structure corresponding to the updated set of local content items; and display, on the graphical user interface, a second indication of an updated total amount of local storage space associated with the content items based on the updated total local storage utilization value.

* * * * *